(12) United States Patent
Ottesen et al.

(10) Patent No.: US 6,665,134 B2
(45) Date of Patent: Dec. 16, 2003

(54) METHODS AND APPARATUS FOR DETECTION AND ANALYSIS OF AN ENVELOPE OF A FREQUENCY MODULATED READBACK SIGNAL IN A MAGNETIC STORAGE SYSTEM

(75) Inventors: Hal Hjalmar Ottesen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 09/872,720

(22) Filed: Jun. 1, 2001

(65) Prior Publication Data
US 2002/0191314 A1 Dec. 19, 2002

(51) Int. Cl.[7] .............................................. G11B 27/36
(52) U.S. Cl. ............................. 360/31; 360/60; 360/25; 360/53
(58) Field of Search .............................. 360/31, 60, 25, 360/53, 75, 67, 30, 29, 46, 43; 324/210, 212, 226; 714/769, 770; 369/53.1, 53.41, 53.42, 53.44

(56) References Cited

U.S. PATENT DOCUMENTS

| | | | | |
|---|---|---|---|---|
| 4,777,544 A | * | 10/1988 | Brown ......................... | 360/75 |
| 5,003,408 A | * | 3/1991 | Farkas ......................... | 360/51 |
| 5,410,439 A | * | 4/1995 | Egbert ......................... | 360/75 |
| 5,594,595 A | | 1/1997 | Zhu | |
| 5,742,446 A | | 4/1998 | Tian et al. | |
| 5,810,477 A | | 9/1998 | Abraham et al. | |
| 5,838,514 A | | 11/1998 | Smith et al. | |
| 6,019,503 A | | 2/2000 | Abraham et al. | |
| 6,046,870 A | * | 4/2000 | Karube ......................... | 360/31 |
| 6,088,176 A | | 7/2000 | Smith et al. | |
| 6,092,412 A | | 7/2000 | Flechsig et al. | |
| 6,275,345 B1 | * | 8/2001 | Ottesen ........................ | 360/25 |
| 6,501,607 B2 | * | 12/2002 | Keirn ........................... | 360/31 |
| 6,504,662 B2 | * | 1/2003 | Sobey ........................... | 360/25 |

OTHER PUBLICATIONS

Kenneth Mason Publications Ltd., England, Reproduced from Research Disclosure, Mar. 1991, No. 323, p. 32367.
U.S. patent application Ser. No. 09/872,554, "Readback Signal Detection and Analysis in a Magnetic Data Storage System," Hal H. Ottesen et al., filed Jun. 1, 2001.

* cited by examiner

Primary Examiner—Alan T. Faber
(74) Attorney, Agent, or Firm—Moser, Patterson & Sheridan, LLP; James R. Nock

(57) ABSTRACT

Embodiments of systems, methods and article of manufacture provide for readback signal detection and analysis. One embodiment provides an in-situ system to detect envelope traces of a readback signal. Using the envelope data, the presence of undesirable activity and/or storage medium surface conditions may be determined. For example, head modulation may be determined. Upon detection of a modulation event in a sector or a track, the compromised data may be recovered using a signal processing system. Another embodiment provides for detection of a thermal signal component in a readback signal. The thermal signal is processed for surface information indicative of the surface condition. Information indicating a defect may then be used to avoid storage areas having the defects.

40 Claims, 16 Drawing Sheets

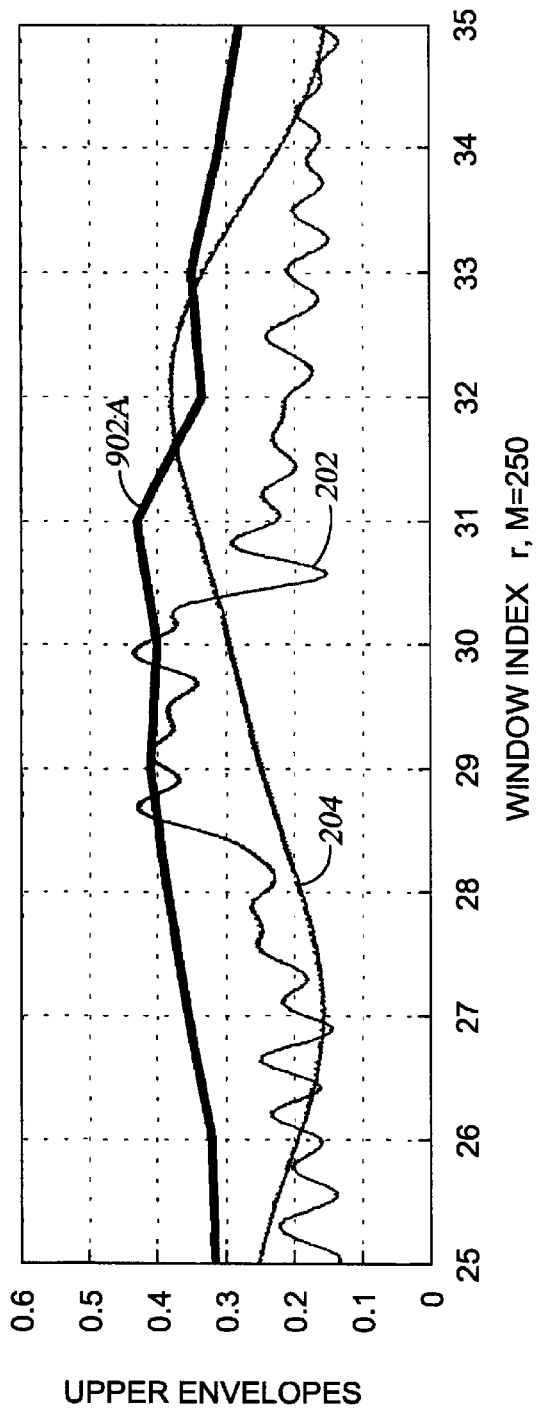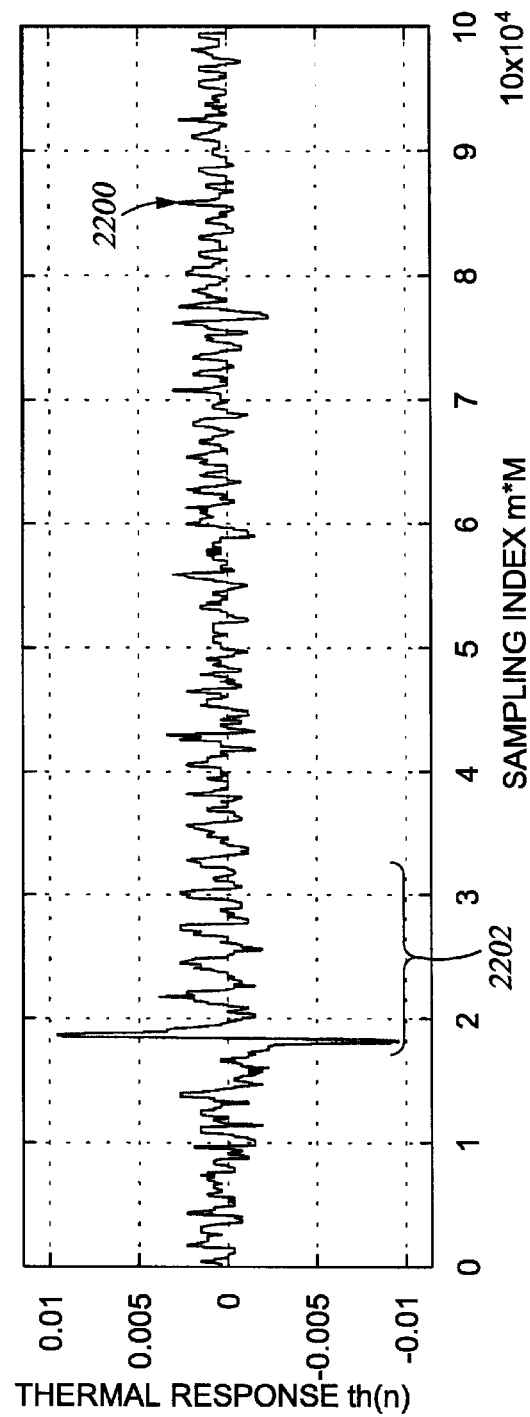
Fig. 11
Fig. 22

METHODS AND APPARATUS FOR DETECTION AND ANALYSIS OF AN ENVELOPE OF A FREQUENCY MODULATED READBACK SIGNAL IN A MAGNETIC STORAGE SYSTEM

CO-PENDING APPLICATIONS

The present invention is related to Ser. No. 09/872,554, entitled "READBACK SIGNAL DETECTION AND ANALYSIS IN A MAGNETIC DATA STORAGE SYSTEM", concurrently filed on Jun. 1, 2001, having the same inventors and assignee as the present invention.

BACKGROUND OF THE INVENTION

1. Field of the Invention

The present invention relates generally to data storage systems, and more particularly, to envelope detection in a magnetic data storage system.

2. Background of the Related Art

A typical magnetic data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks. The actuator typically includes one or more outwardly extending arms to which in-line suspensions are attached and onto which one or more air bearing sliders are mounted at a distal end of the suspensions. One or more transducers, in turn, are disposed on the air bearing slider. Airflow produced above the disk surface by the rapidly rotating disks results in the production of an air bearing upon which the aerodynamic slider is supported, thus causing the slider to fly a small distance above the rotating disk surface.

The actuator arms are interleaved into and out of the stack of rotating disks, typically by means of a rotary voice coil assembly mounted to the actuator. The rotary voice coil assembly generally interacts with a permanent magnet structure, and the application of current to the coil in one polarity causes the actuator arms, suspensions and sliders to shift in one radial direction, while current of the opposite polarity shifts the actuator arms and sliders in an opposite radial direction.

In a typical magnetic digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification, synchronization and radial position information, for example. Data is transferred to and retrieved from specified track and sector locations by the transducers being moved from track to track, typically under the control of a position controller.

The transducer, also referred to as a read/write head, is one of the most important components in a magnetic disk drive system. The transducer assembly typically includes a read element and a write element. A common type of read element is the magnetoresistive (MR) head. A conventional read head operates by sensing the rate of change of magnetic flux transitions stored on the surface of a magnetic disk. The MR head produces an electrical output signal in response to the sensed magnetic flux transitions. The MR head's output signal is velocity independent.

Writing data to a data storage disk generally involves passing a current through the write element of the transducer assembly to produce magnetic lines of flux which magnetize a specific location of the disk surface. Reading data from a specified disk location is typically accomplished by a MR read element transducer sensing the magnetic field or flux lines emanating from the magnetized locations of the disk. As the read element passes over the rotating disk surface, the interaction between the read element and the emanating field from the magnetized locations on the disk surface results in the production of electrical signals, commonly referred to as readback signals, in the read element.

MR heads represent an important improvement in magnetic disk drive systems. In particular, the output signal of a MR head is not dependent on the relative velocity between the head and the disk. MR heads may employ an inductive write element. In contrast to older head assemblies, a MR head uses a modified read element employing features such as a thin sensing element called an "MR stripe". The MR stripe operates based upon the magnetoresistive effect. Namely, the resistance of the MR stripe changes in proportion to the magnetic field of the disk, passing by the MR stripe. If the MR stripe is driven with a constant bias current, the voltage across the MR stripe is proportional to its resistance. Thus, the MR stripe's voltage represents the magnetic signals encoded on the disk surface. In other arrangements, a constant voltage is applied to the MR stripe, and the resultant current is measured to detect magnetic signals stored on the disk surface.

Although highly beneficial, MR heads are especially susceptible to certain errors. Namely, the resistance of the MR stripe varies in response to heating and cooling of the MR stripe, in addition to the magnetic flux signals encoded on the disk surface. Normally, the MR stripe maintains a steady state temperature as the slider flies over the disk surface, separated by a thin cushion of air created by the rapidly spinning disk. In this state, the stored magnetic flux signals contribute most significantly to the MR stripe's output signals, as intended. An MR stripe, however, may experience heating under certain conditions, especially when the MR head inadvertently contacts another object on the disk.

Physical contact with the MR head may occur in a number of different ways. For instance, the MR head may contact a raised irregularity in the disk surface, such as a defect in the material of the disk surface or a contaminant such as a particle of dust, debris, etc. Also, the MR head may contact the disk surface during a high shock event, where G-forces momentarily bounce the MR head against the disk surface.

Such physical contact results in heating of the MR head, including the MR stripe. Heating of the MR stripe increases the stripe resistance, which distorts the MR stripe's output signal. This type of distortion is known in the art as a "thermal asperity." A read channel in a magnetic disk drive, however, requires a reliable readback signal from the MR head, free from irregularities such as thermal asperities. Consequently, severe thermal asperities may prevent the read channel from correctly processing output signals of the MR head, causing a data error.

These data errors may be manifested in a number of different ways. For instance, severe distortions of the readback signal may cause the magnetic disk drive to shut down. Other data errors may simply prevent reading of data on the disk. Such data errors may also prevent writing of data, if the servo signal embedded in the disk cannot be read correctly, or it indicates that the head is too far off track to write data without overwriting data on an adjacent track. This condition is called a "write inhibit error". If data errors of this type persist, the disk drive may deem the entire sector "bad", causing a write inhibit "hard" error. Repeated thermal asperities may also cause a disk drive to fail a predictive failure analysis measure, falsely signaling an impending disk failure to the disk drive user. As shown by the foregoing, thermal asperities in magnetic disk drive systems may cause significant problems in disk drives that use MR heads.

It is now known that the thermal asperites and other heating/cooling events contribute a thermal signal component (baseline-wander) to the overall readback signal. As such, the readback signal may be understood as a composite signal comprising a magnetic component and the thermal component. A detailed discussion regarding these signal characteristics may be found in U.S. Pat. No. 6,088,176, entitled "Method and Apparatus for Separating Magnetic and Thermal Components from an MR Read Signal," which is hereby incorporated by reference.

Despite its undesirability, the thermal signal component has been used to advantage in detecting any surface defects on disks. By monitoring the thermal signal component of a readback signal, the foregoing problems related to thermal asperties may be identified and eliminated or mitigated. One attempt to address the effects of thermal asperities is by separating a thermal signal component from the magnetic component. Once separated, the thermal signal component may be analyzed to determine the presence of surface defects on a disk.

However, conventional techniques for detecting a thermal signal in a readback signal have heretofore been unsuccessful in cases of readback signals having strong frequency modulations. Current methods require that a track in question is erased or is magnetically written to with a constant frequency. Such an approach is inconvenient for predictive failure analysis (PFA), since a suspected track pre-written with data would have to first be moved to another track. In addition, the track would be either erased or written at a constant frequency before the thermal signal can be extracted and processed for defects.

A more significant problem arises in the event of a hard data error that cannot be recovered. In general, it is preferable to recover the data from where it was originally written on the disk space. As a result, any attempt to move the compromised data to another track may lead to permanent loss of all or part of the data.

Another reason for monitoring and analyzing readback signals is to identify problems related to head spacing modulations. Head modulation refers to a time varying fly height of the read/write head which may produce hard read errors or write-verify errors. The modulation occurs because of a resonance instability in the head-slider during the read/write-operation. This resonance may be due to airbearing resonance, suspension resonance, slider instability, etc. Head modulation may also be non-periodic which is caused by contact with asperities on the disk surface. The problem manifests itself by causing sinusoidal modulations of the readback signal at the airbearing resonance frequency, typically around 200–250 kHz for modern sliders. The head modulations can be present on one track or just a single sector, while the adjacent tracks and sectors are free from modulations.

An illustration of head modulation over one single data sector may be illustrated with reference to FIG. 1. FIG. 1 shows a readback signal 100 contained within an upper envelope 102a and a lower envelope 102b. The sinusoidal modulation of the envelopes 102a–b is clearly visible. This gives rise to data errors in the readback signal 100.

As a result of the problems caused by head modulations, improving the magnetic recording performance in a hard disk drive or a tape drive requires the continuous monitoring of the envelope of the readback signal. An automatic gain control (AGC), for example, uses a signal derived from the envelope of the readback signal to maintain a constant amplitude of the readback signal before detection by the data channel. A void in the magnetic-coating on the disk surface is easily detected as a very low level output of the envelope signal. The time/frequency analysis of magnitude variations in the envelope of the readback signal can, in many cases, reveal problems with the head/disk interference caused by defects on the disk surface, by suspension resonances, by airbearing resonances, by local aerodynamic instabilities of the slider, etc.

Conventional methods and systems for envelope detection include full-wave or half-wave rectification followed by lowpass filtering. However, conventional approaches for envelope detection have proved inadequate. While such methods work well for a readback signal of constant frequency, they are not suited for frequency-modulated readback signals (e.g., readback signals from storage space containing data). Even more difficult is to detect the presence of head modulation over storage space containing data. Detection of head modulation is made difficult because of the large variation in frequencies of the readback signal from the data.

The shortcomings of conventional envelope detection approaches may be illustrated with reference to FIG. 2. FIG. 2 shows two lowpass-filtered, full-wave rectified representations of the upper envelope 102a of the readback signal 100 (shown in FIG. 1). Specifically, a high-frequency bandwidth envelope 202 and a low-frequency envelope bandwidth 204 are shown. The high-frequency bandwidth envelope was the lowpass filtered at 5 MHz, while the low-frequency bandwidth envelope was lowpass filtered at 0.5 MHz. The lowpass filter was a sixth-order, elliptic filter. The sampling rate for this readback data was 500 MHz. Each envelope 202, 204 substantially fails to provide an accurate representation of the upper envelope 102a of the readback signal 100.

Therefore, there exists a need for a system and method for detecting envelope modulation and analyzing readback signals for a thermal signal components and head modulation activity.

SUMMARY OF THE INVENTION

In one embodiment, a method comprises receiving an envelope of a frequency modulated readback signal representative of data read by a head assembly from a storage medium and determining modulation activity of the head assembly based on amplitude characteristics of the envelope. Then, at least one of a read operation and a write operation is terminated.

Another embodiment provides a signal bearing medium, comprising a sorting program for determining values of a readback signal envelope in order to determine head modulation activity of a head assembly in a disk drive facility. When executed by a processor the sorting program performs a method comprising receiving a frequency modulated readback signal representative of data read by a head assembly from a storage medium; and locating envelope samples within a window of the of the readback signal, each envelope sample comprising an Nth largest envelope sample and an Nth smallest envelope sample.

Still another embodiment provides an apparatus configured to determine head modulation activity of a head assembly in a disk drive facility. The apparatus comprises a write inhibit system configured to output a readback signal and configured to issue at least a write inhibit signal when threshold conditions are satisfied; and an envelope detector connected to the write inhibit system. The envelope detector is configured to locate envelope samples of a predetermined size from the readback signal over a series of consecutive and adjacent windows, each window comprising M samples.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 11 is a graph comparing envelope traces using a reduced sorting algorithm and envelope traces using conventional methods.

FIG. 22 is a graph showing an amplified thermal response of the signal of FIG. 21.

DETAILED DESCRIPTION OF THE PREFERRED EMBODIMENTS

Embodiments of systems, methods and article of manufacture provide for readback signal detection and analysis. One embodiment provides an in-situ system to detect envelope traces of a readback signal. Using the envelope data, the presence of undesirable activity and/or storage medium surface conditions may be determined. For example, periodic head modulation may be determined. Upon detection of a periodic modulation event in a sector or a track, the compromised data may be recovered using a signal processing system. Another embodiment provides for detection of a thermal signal component in a readback signal. The thermal signal is processed for surface information indicative of the storage medium surface condition. Information indicating a defect may then be used to avoid storage areas having the defects. In addition to the foregoing, other embodiments within the scope of the present invention will be recognized by those skilled in the art.

Envelope Detection and Read/Write Inhibit

Figure 3:
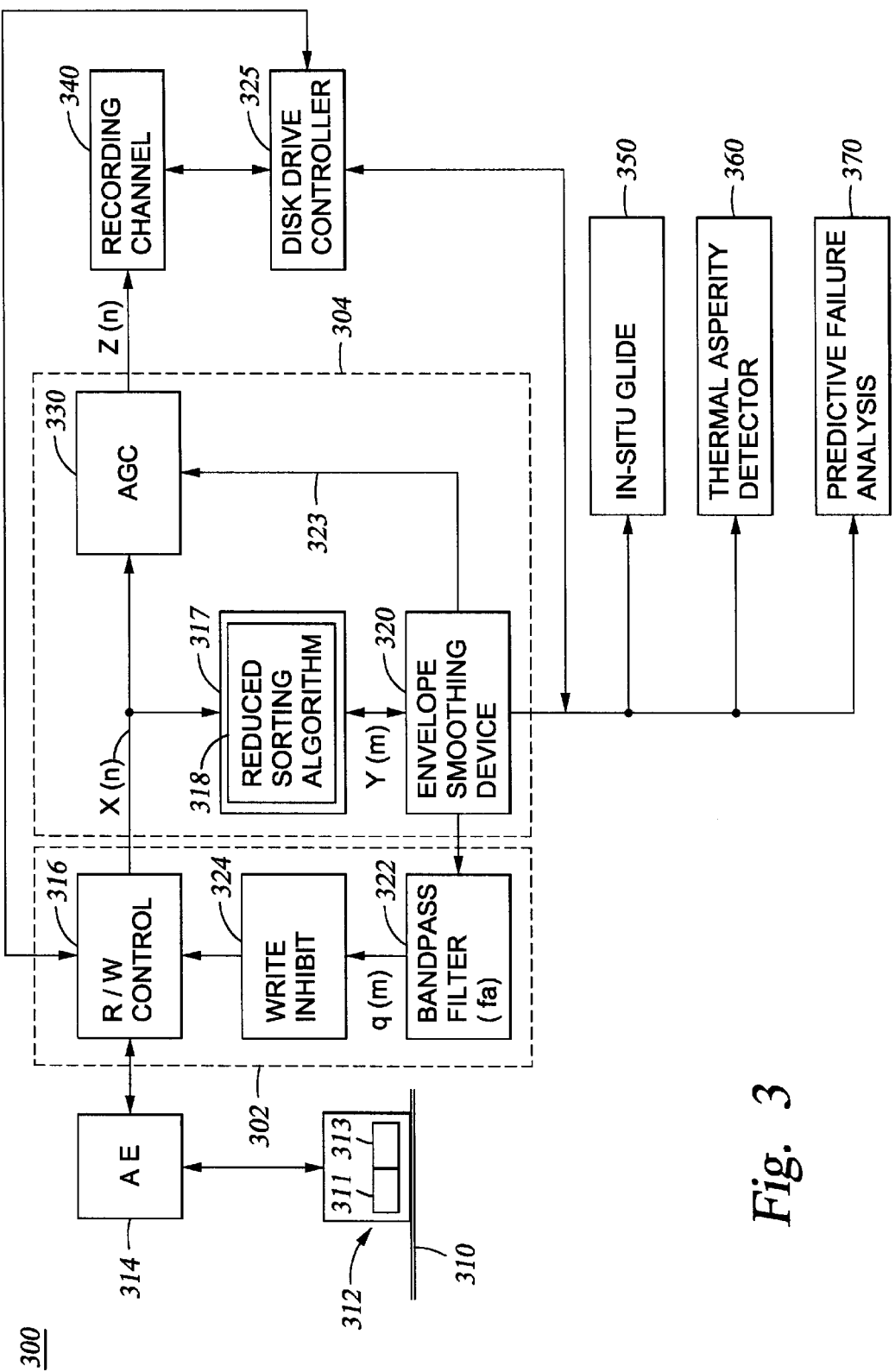
FIG. 3 is a system diagram of an envelope detection system.

FIG. 3 is system diagram of an envelope detection system 300. In general, the system 300 operates to determine whether a head modulation event exists. If so, a write inhibit signal is issued to prevent a writing operation. Generally, the system 300 comprises an arm-electronic (AE) module 314, a read/write (R/W) inhibit system 302 and an automatic gain control (AGC) system 304. In one embodiment, the R/W Inhibit System 302 comprises a R/W control 316, a bandpass filter 322 and a write inhibit module 324. The AGC system 304 illustratively comprises a dual envelope detector 317 (also referred to herein as "reduced sorting module"), an envelope smoothing device 320, and an AGC 330. Each of the foregoing components is described in more detail below. However, it is understood that the system 300 is merely representative of one embodiment and persons skilled in the art will readily identify additional embodiments.

The envelope detection system 300 includes a disk 310 that provides a medium for magnetically stored data. A head/slider assembly 312 is positioned and configured for reading or writing information on the surface of the disk 310. In general, head/slider assembly 312 may include a read head 311 and a write head 313. The signal output by the read head 311 of the head/slider assembly 312 is herein referred to as the readback signal. The readback signal is amplified and high pass filtered in an arm-electronic (AE) module 314. The output of AE 314 is fed into a R/W control 316, which has the necessary sampling rate, the analog-to-digital (AID) conversion for reading and the digital-to-analog (D/A) conversion for writing. The output of the R/W control block 316 is a sampled readback signal x(n).

Figure 5:
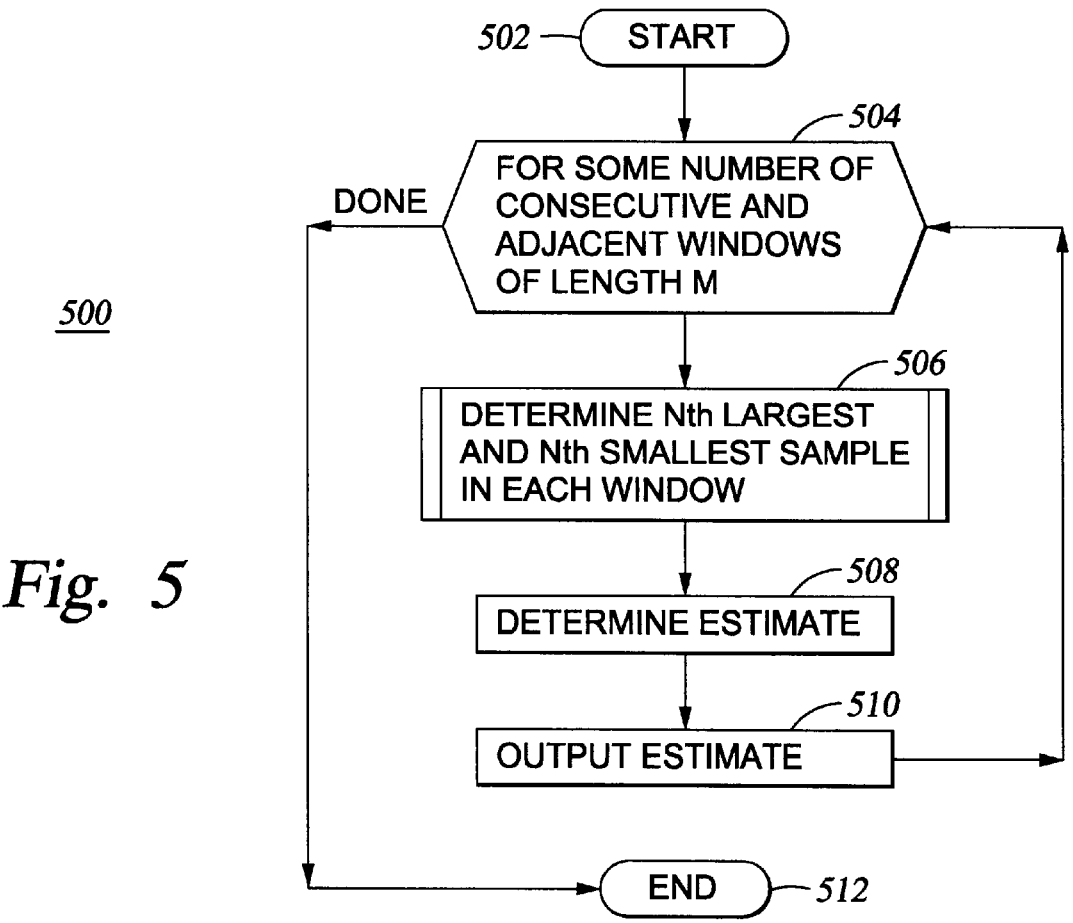
FIG. 5 is a flow chart of a reduced sorting algorithm.

The sampled readback signal x(n) is provided to a dual envelope detector 317. The dual envelope detector 317 is configured with a reduced sorting program 318 which, when executed, locates a sample(s) of the readback signal x(n) over a series of consecutive and adjacent windows each of M samples. The sample(s) to be located is predetermined according to size. For example, a second largest sample and/or a second smallest sample may be located. The sample located by the reduced sorting program 318 is used as a sample of the readback signal envelope shown as y(m) at the output of the dual envelope detector 317. In particular, an upper envelope (referred to herein as y_upper(m)) and a lower envelope (referred to herein as y_lower(m)) may be determined. Illustratively, the sampling rate of the envelope y(m) is fs/M, where fs is the sampling rate of the readback signal x(n) and M is a window length. Each window of length M will provide one sample for the upper envelope, y_upper(m), and one sample for the lower envelope, y_lower(m). One embodiment of the execution of the reduced sorting program 318 is shown in FIG. 5.

The envelope samples y(m) are sequentially assembled in an envelope smoothing device 320. In one embodiment, the envelope smoothing device 320 is configured for averaging or smoothing of the envelope sequence. As such, the envelope smoothing device 320 may include a lowpass filter.

The output of the envelope smoothing device 320 is filtered in a bandpass filter 322 centered at a head/slider specific airbearing frequency, fa, where fa is the nominal frequency of the air bearing frequency. The output of the bandpass filter 322 is fed into the R/W Inhibit module 324. In the event predetermined conditions are met, the R/W Inhibit module 324 issues a R/W inhibit signal to the R/W control 316. Thus, reading and/or writing is inhibited and the disk drive controller 325 will enter an error recovery procedure (ERP) to recover the data within the data sector at which the modulation is occurring. In one embodiment, if the data is recovered, then the sector is over-written with the currently recovered data or the recovered data is reassigned to another alternate sector.

In one embodiment, the R/W Inhibit module 324 is configured to rectify and lowpass filter an input signal. The resulting output of the band pass filter 322, referred to herein as q(m), may be provided to a threshold detector (See FIG. 4). The threshold detector is calibrated based on the track amplitudes when head modulation is absent. If the resulting output q(m) exceeds a pre-specified level, then a head modulation event is present within the data sector, or a protruding defect causing airbearing modulation is present. In the event of head modulation activity, a R/W inhibit signal is produced by the R/W Inhibit module 324 and provided to the R/W control 316.

Figure 4:
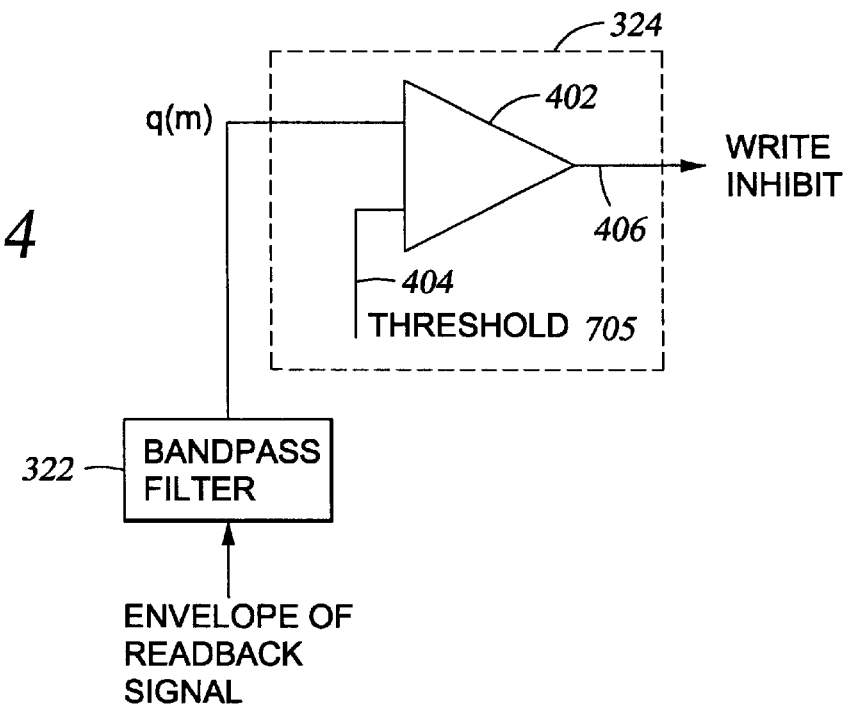
FIG. 4 is one embodiment of a write inhibit device.

One embodiment of the R/W Inhibit module 324 is shown in FIG. 4. Illustratively, the R/W Inhibit module 324 comprises a comparator 402. The comparator 402 receives a signal from the bandpass filter 322 and a threshold signal on a threshold input line 404. The threshold signal may be determined by adjusting the threshold signal on the input line 404 when head is not modulating. The threshold signal is adjusted to a point just above where a write inhibit would be generated. Alternatively, a training sequence may be used. Once determined, the threshold signal may then be stored on some persistent storage device (e.g., a read only memory (ROM)) operably connected to the input 404. In operation, the comparator 402 is configured to determine whether the magnitude of the signal received from the bandpass filter 322 exceeds the threshold signal. If so, a write (or read) inhibit signal is generated by the comparator 402 and provided to an output line 406 connected to the R/W control 316. In response to the inhibit signal the R/W control 316 operates to prevent a write or read operation, according to the operation scheduled to be performed or being performed.

In one embodiment, data recovery is accomplished by a recording channel 340 which receives a signal z(n) from the AGC system 304. As described above, AGC system 304 comprises the dual envelope detector 317, the envelope smoothing device 320 and the AGC 330. In addition to providing an output to the bandpass filter 322, the envelope smoothing device 320 also provides an AGC control signal to the AGC 330. Preferably, the AGC control signal is a high-bandwidth, smoothed signal. In one embodiment, AGC control signal is 1–10 MHz. The AGC 330 is configured to provide an output z(n) having uniform envelope amplitude, in spite of any envelope-modulation activity present in the readback signal x(n). In this manner, the high-bandwidth AGC system 304 facilitates recovery of data compromised by envelope-modulation in the readback signal x(n).

In one embodiment, the system 300 also includes an in-situ glide system 350, a thermal asperity detector 360, and a predictive failure analysis (PFA) system 370. Each of the foregoing three components utilize the envelope of the readback signal x(n) provided by the envelope detector system 320. Illustrative in-situ glide systems and PFA systems that may be used to advantage are described in U.S. Pat. No. 5,410,439, entitled "Disk File with Clearance and Glide Measurement and Early Head Crash Warning" and issued to International Business Machines Corporation. The thermal asperity detector 360 determines an estimate of a thermal disparity. Illustratively, the thermal asperity detector 360 performs thermal asperity detection by setting a threshold for Equation 6, described below. Embodiments of the PFA system 370 are described below.

FIG. 5 shows a method 500 for determining the sampled envelope values y_upper(m) and y_lower(m). The method 500 may be understood as one embodiment of the reduced sorting algorithm 318. Method 500 may be used to determine either or both of the envelope values y_upper(m) and y_lower(m).

Method 500 is entered at step 502 upon receiving a readback signal sample, x(n) and then proceeds to step 504 where an iterative process is entered for some number of consecutive and adjacent windows, each window having a window of length M. The window length M represents the number of samples contained in the window. The number of windows to be analyzed may be determined according to implementation and experimentation. Similarly, the length, M, of each window may be varied according to implementation. In general, the number of windows and the window length is sufficient to identify the presence of any amplitude modulation in the readback signal.

In a particular embodiment, the size of the window is determined by Equation 1.

$$M > fs/fw(low) \qquad \text{Equation 1}$$

For Equation 1, fs is the sampling rate used to derive sampled signal x(n), and fw(low) is the lowest frequency component, i.e., the frequency-modulation (FM) frequency, in the data portion of the readback signal. Thus, for example, if the sampling rate fs=250 MHz and fw(low)=10 MHz, then the minimum window length is M=25.

At step 506, an Nth largest sample and Nth smallest sample in the window are determined. As noted above, method 500 may be implemented to determine both the upper envelope and the lower envelope. Accordingly, where the lower envelope (which is defined by negative values) is to be determined, the Nth largest sample and Nth smallest sample may be the absolute values of the samples.

In a particular embodiment, the second largest and second smallest samples are determined at step 506. Using the second largest/smallest sample within the window M reduces the effect of impulsive noise (e.g., spikes) that often occurs in the readback signal x(n). However, it is understood that any sample may be used to advantage and the present embodiment is merely illustrative. Thus, in another embodiment, the third largest and second smallest sample may be determined by the reduced sorting program 318.

At step 508, an estimate is determined. In one embodiment, an estimate of the amplitude of the readback signal is determined. The amplitude may be defined as the peak-to-peak difference between the Nth largest and Nth smallest sample. In another embodiment, the estimate is a thermal signal component of the readback signal. Illustratively, the thermal signal component is defined as the average of the Nth largest and Nth smallest sample. One embodiment for determining the thermal signal component is described below with reference to Equation 6.

At step 510, the estimate is output to the envelope smoothing device 310. Steps 506 through 510 are repeated for some number of windows, which number may be pre-determined or may be determined on-the-fly after one or iterations of steps 506 through 510. Once a desired number of windows have been analyzed, the method 500 exits at step 512.

Figure 6:
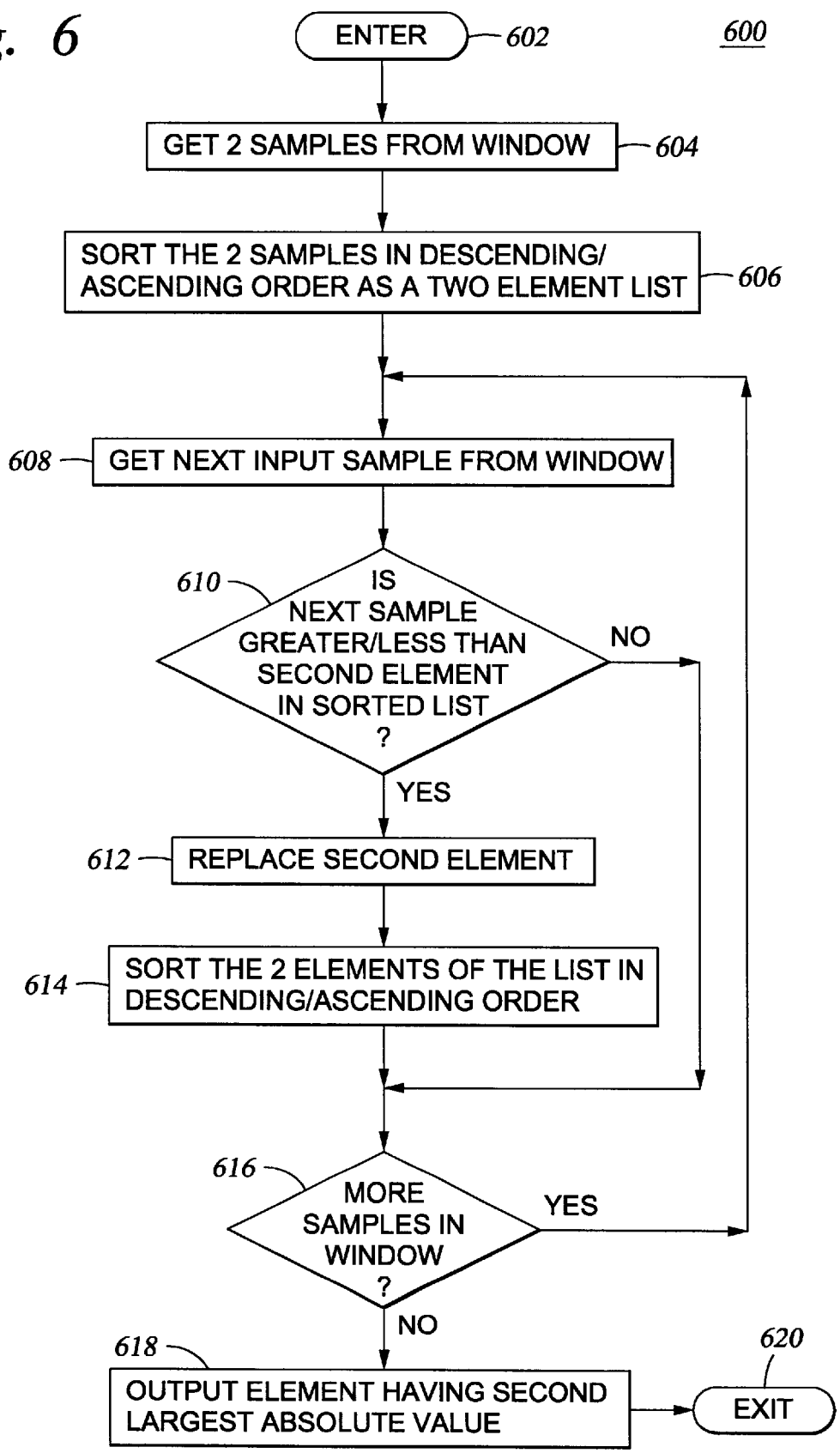
FIG. 6 is a flow chart of a reduced sorting algorithm.

One embodiment for determining the Nth largest and Nth smallest sample is shown in FIG. 6. For brevity, the logic for determining the Nth largest and Nth smallest sample is shown as a single flow chart. Method 600 is entered from method 500 at step 602. At step 604 the method 600 gets two samples from a window. At step 606, the two samples are sorted as a two-element list. In the case of determining the Nth largest sample, the list is sorted in descending order. In the case of determining the Nth smallest sample, the list is sorted in ascending order.

At step 608, another input sample from the window is retrieved. At step 610, the method 600 queries whether the sample retrieved at step 608 is greater than the second element in the sorted list, in the case of determining the Nth largest sample, or less than the second element in the list, in the case of determining the Nth smallest sample. If step 610 is answered affirmatively, the method 600 proceeds to step 612 and replaces the second element in the sorted list with the sample retrieved at step 608. The two elements in the list are then sorted in ascending/descending order at step 614. The method 600 then proceeds to step 616. The method 600 also proceeds to step 616 from step 610 in the event that step 610 is answered negatively.

At step 616 the method 600 queries whether the window currently being analyzed contains additional samples for analysis. If not, the first element in the list is output as the Nth largest/smallest sample for the window analyzed. The method 600 then exits at step 620. If step 616 is answered affirmatively, the method 600 returns to step 604 to retrieve another input sample.

Figure 7:
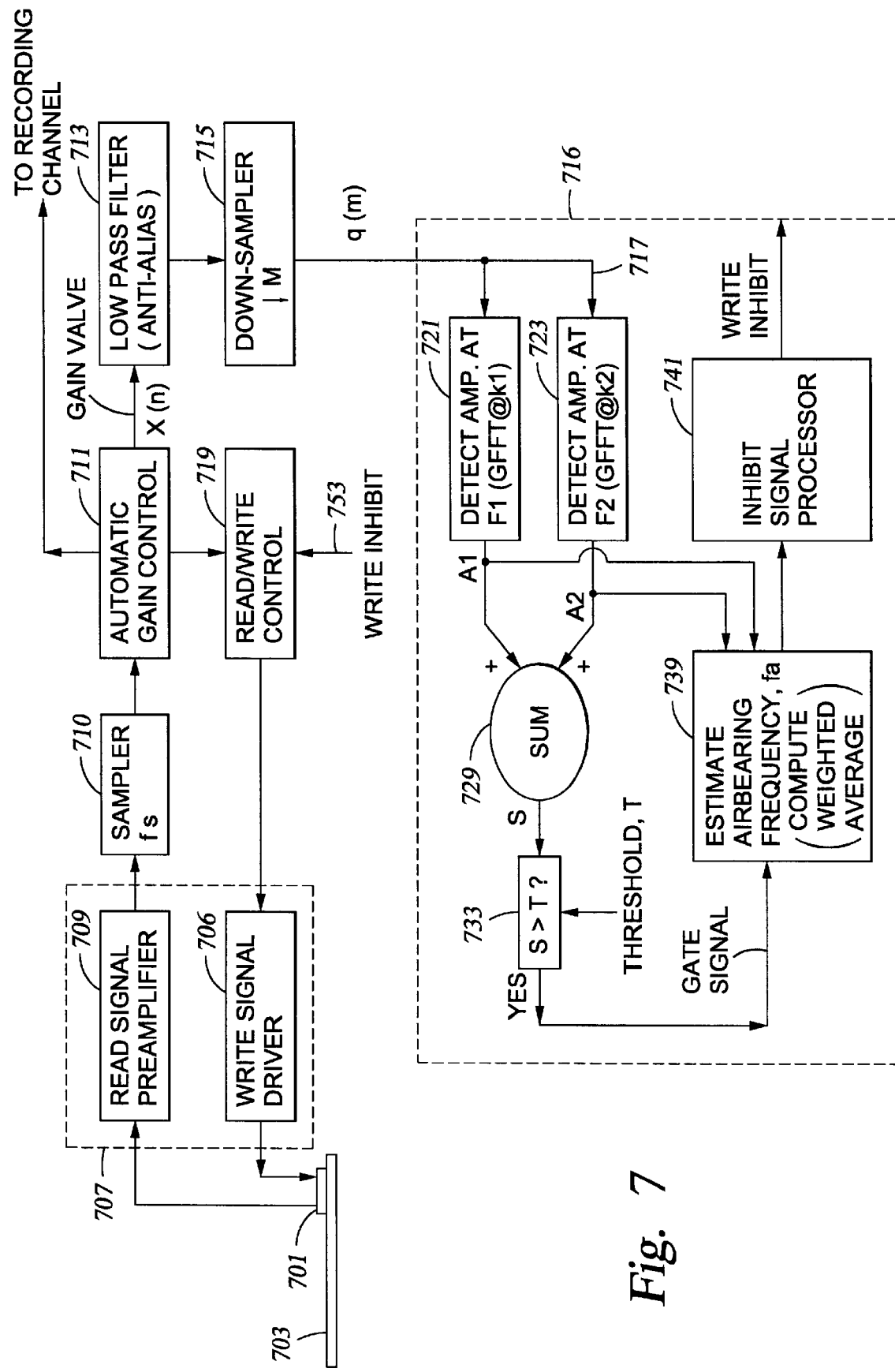
FIG. 7 is a system diagram of an envelope detection and write/read inhibit system.

FIG. 7 shows another embodiment of an envelope detection system 700. In general, the system 700 comprises an AE module 707, a sampler 710, a AGC 711, a low pass filter 713, a down-sampler 715, a write inhibit system 716 and a RAW control 619. Illustratively, the AE module 707 includes a read signal amplifier 709 and a write signal driver 706. The read signal amplifier 709 and the write signal driver 706 are both connected to a read/write head 701 which is positioned in proximity to a storage medium 703 (e.g., a magnetic disk).

Generally, the write inhibit system 716 is configured to determine whether an airbearing frequency is present in a readback signal and, if so, to determine whether the frequency is within a particular range. The write inhibit system 716 may be implemented as software, hardware or a combination of both. In the illustrative embodiment, the write inhibit system 716 comprises a pair of harmonic frequency amplitude detectors 721, 723, a summing device 729, a comparator 733, an estimator 739 and a inhibit signal processor 741. The provision of two harmonic frequency amplitude detectors 721, 723 allows frequency detection for two different harmonic frequencies to occur in parallel. In another embodiment, only one detector is used and the detection for each harmonic frequency is performed in series. In addition, other embodiment may include more than two frequency detectors.

In operation, the read/write head 701 produces a read signal corresponding to the magnetic bits stored in a magnetic layer of storage medium 703. The read signal is amplified and high pass filtered by the read signal preamplifier 709. The signal from the read signal preamplifier 709 is sampled in sampler 710 to produce a sampled signal x(n). The sampled signal x(n) is then provided to the AGC 711 which outputs a constant amplitude signal to a recording channel which detects from the signal the data from the storage medium 703. In addition, the sampled signal x(n) is filtered in a low pass filter 713, which servers as an antialias filter. The low pass filter 713 is configured to restrict the sampled signal x(n) to airbearing frequencies (and below), which are typically relatively lower frequencies. As such, the low pass filter 713 attenuates higher signal frequencies present in the sampled signal x(n). By reducing the frequency range of the output signal, the low pass filter 713 acts to reduce aliasing since the output of low pass filter 713 is re-sampled down by the down-sampler 715. Illustratively, the cutoff frequency for the low pass filter 713 is about $500 \times 10^3$ Hz.

The down-sampler 715 samples the output of the low pass filter 713 in order to attain a frequency spectrum at its output that is predominantly below 1.5 MHz. Accordingly, in one embodiment, the frequency spectrum is predominantly below about $1.5 \times 10^6$ Hz. The output of the down-sampler 717 is then provided to the write inhibit system 716.

In particular, the output of the sampler 717 is provided to the pair of harmonic frequency amplitude detectors 721 and 723. Each detector 721, 723 is configured to detect the harmonic signal amplitude at a predetermined frequency. In one embodiment, the harmonic frequency amplitude detectors 721, 723 employ Goertzel's algorithm for finding the Discrete Fourier Transform (DFT) at a particular DFT index k, where k is an integer value. For example, the first detector 721 may determine an DFT index k1, referred to as GDFT@k1. The second detector 723 may determine an DFT index k2, referred to as GDFT@k2. The amplitude outputs of the first detector 721 and the second detector 723 are referred to as A1 and A2, respectively.

The following discussion provides additional detail for the use Goertzel algorithm. M is defined as the window length; that is, M is the number of samples of the readback signal in a window. N is defined as the number of consecutive adjacent windows. The Goertzel algorithm uses a recursive method to find the signal amplitude at a harmonic frequency fk.

The frequency range of this envelope modulation frequency of interest is between f1 and f2. Frequencies f1 and f2 are typically the lower and upper expected airbearing frequencies, respectively.

The Goertzel algorithm processes the results of N windows. Each window is (previously) analyzed using the reduced sorting algorithm 318 in order to produce a single number. Therefore, the Goertzel algorithm receives N numbers received from the reduced sorting algorithm.

The appropriate values for k for GFFT@k are determined as show by Equations 2–3. For Equations 2–3, f1, f2 are defined as r*fs/N, where r must be an integer that is less than or equal to N/2. The sampling rate of the down-sampler 715 is fs.

$$k1 = f1/fs * N \qquad \text{Equation 2}$$

$$k2 = f2/fs * N \qquad \text{Equation 3}$$

The outputs of the detectors 721, 723 (which are amplitude estimates) are sent both to the summing device 729 and to the airbearing frequency estimator 739. The summing device 729 computes the sum of the two amplitude estimates and produces a sum, S. The sum S is then compared to a threshold value, T. in the comparator 733. T may be tuned according to application and is selected according to a statistical method in manufacturing. If S is greater than T, a gate signal is sent to the airbearing frequency estimator 739. If S is less than or equal to T, then no further processing is performed by the write/read inhibit system 716. In this manner, a preliminary determination is made of the presence of an airbearing frequency in the readback signal.

If the gate signal is output, the airbearing frequency estimator 739 performs calculations to estimate the airbearing modulation frequency, fa. In one embodiment, the airbearing frequency estimator 739 computes a weighted average. Illustratively, Equation 4 may be used to determine fa.

$$fa = fo \times [A1 \times k1 + A2 \times k2]/(A1 + A2) \qquad \text{Equation 4}$$

The value fo is the frequency resolution fo=fo/M. The frequency fo is calculated based on the sampling frequency, fs, of the sampler 715 and the number of samples, N, of the sampler output used for the calculation of A1 and A2. Equation 5 provides one formula for determining fo. For example, if $fs=1.5 \times 10^6$ Hz and N=20, then $fo=75 \times 10^3$ Hz and k1=2 and k2=3, where k1 and k2 are the second and third DFT harmonics, respectively.

$$fo = fs/M, \qquad \text{Equation 5}$$

where M is the down sampling rate taken by the down-sampler 715.

Once calculated, the estimated airbearing frequency fa is provided to the inhibit signal processor 741. In one embodiment, the estimated airbearing frequency fa is compared to an upper and lower limit defining the expected range of airbearing frequencies. This comparison may be performed for typical limits between $150 \times 10^3$ Hz (150 kHz) and $250 \times 10^3$ Hz (250 kHz). If the airbearing frequency, fa, falls within the predetermined range, a write/read inhibit signal is issued to the R/W controller 719, thereby causing data from to R/W controller 719 to not be written/read. If the airbearing frequency, fa, is not within the predetermined range, no further processing is performed by the write/read inhibit system 716.

Figure 23:
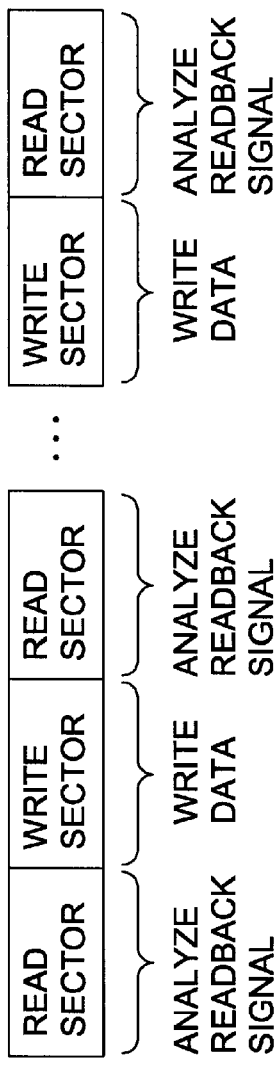
FIG. 23 shows a sequence in which a read operation and write operation are alternated every other sector.
Figure 24:
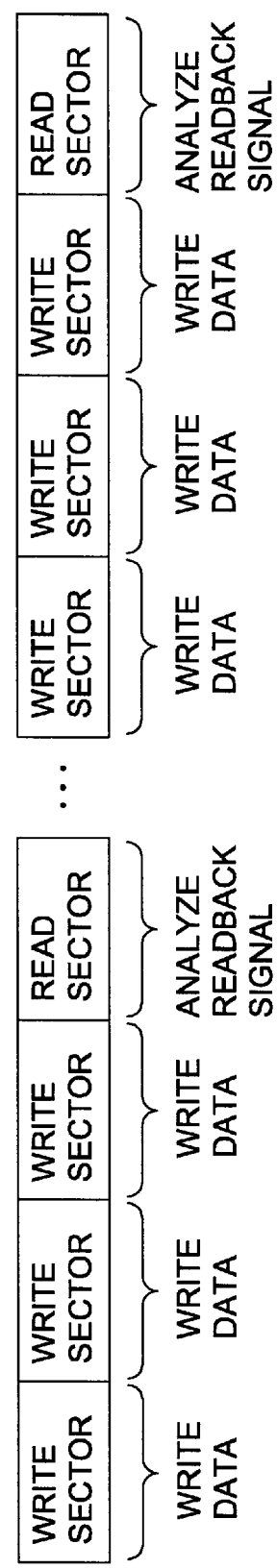
FIG. 24 illustrates an operation in which every third sector is read while the other sectors are written.

It is understood that embodiments of the present invention are applicable regardless of the pattern of a particular read/write sequence. Thus, in general, read and write operations may be alternately performed over any number of sectors. For example, FIG. 23 shows a sequence in which a read operation and write operation are alternated every other sector. The purpose of such an arrangement is to acquire a read back signal before and after each sector is written in order to determine the presence of head modulation. In some cases, however, it may be desirable to write to multiple sequential sectors before reading a sector. FIG. 24 illustrates an operation in which every third sector is read while the other sectors are written. Multiple sector sequential writes are common, for example, for audio, video and other multimedia data files. Multiple sequential sector writes may also be performed if the analysis for head modulation takes several sectors. It should be noted that regardless of the read/write pattern, the present embodiments do not limit the recording capacity of a disk drive because the sectors that are read between written sectors become sectors that can be written once it has been determined that no head modulation is present.

Figure 25A:
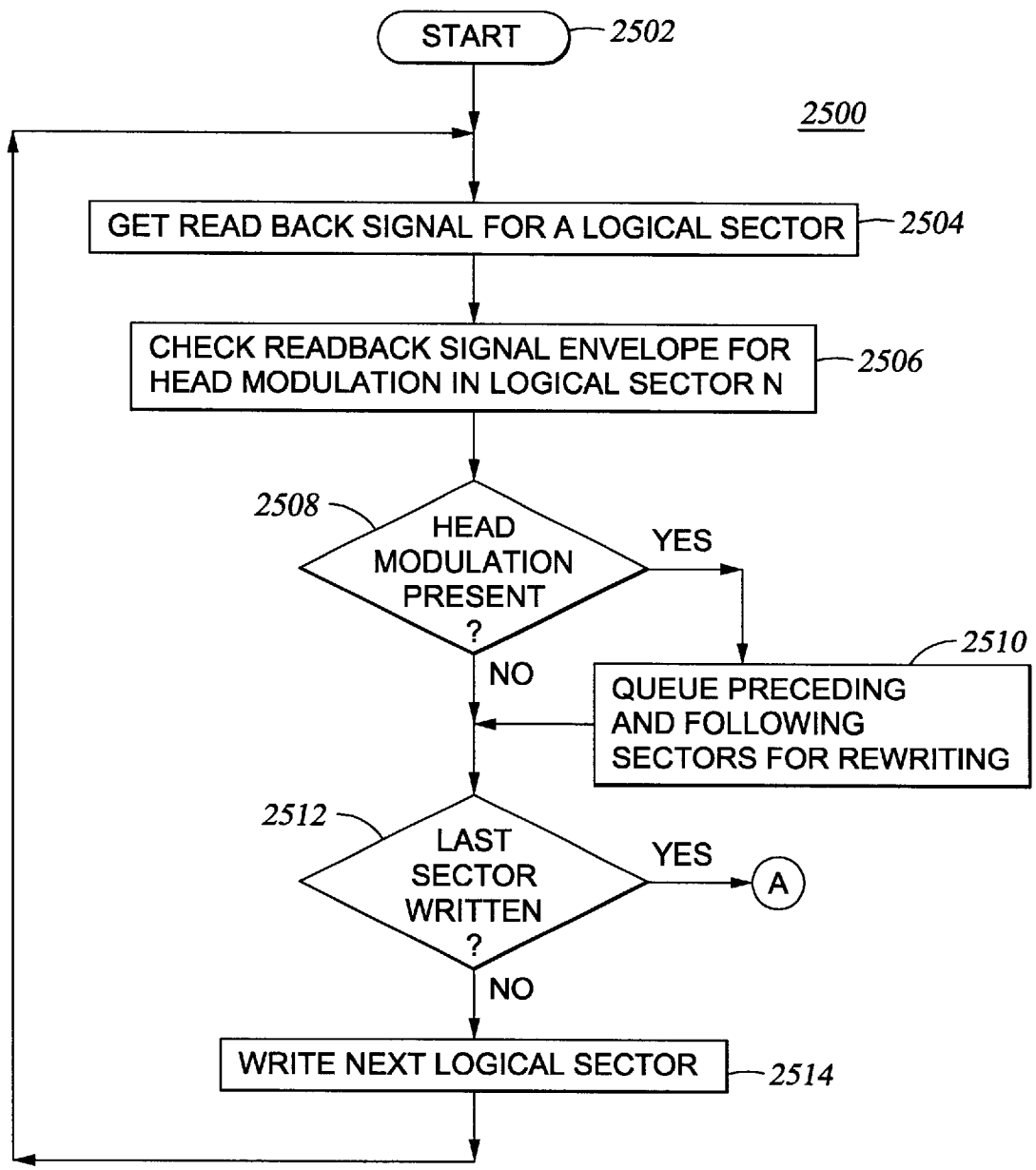
FIGS. 25A and B shows a method for determining head modulation during a pattern of alternate reading and writing.
Figure 25B:
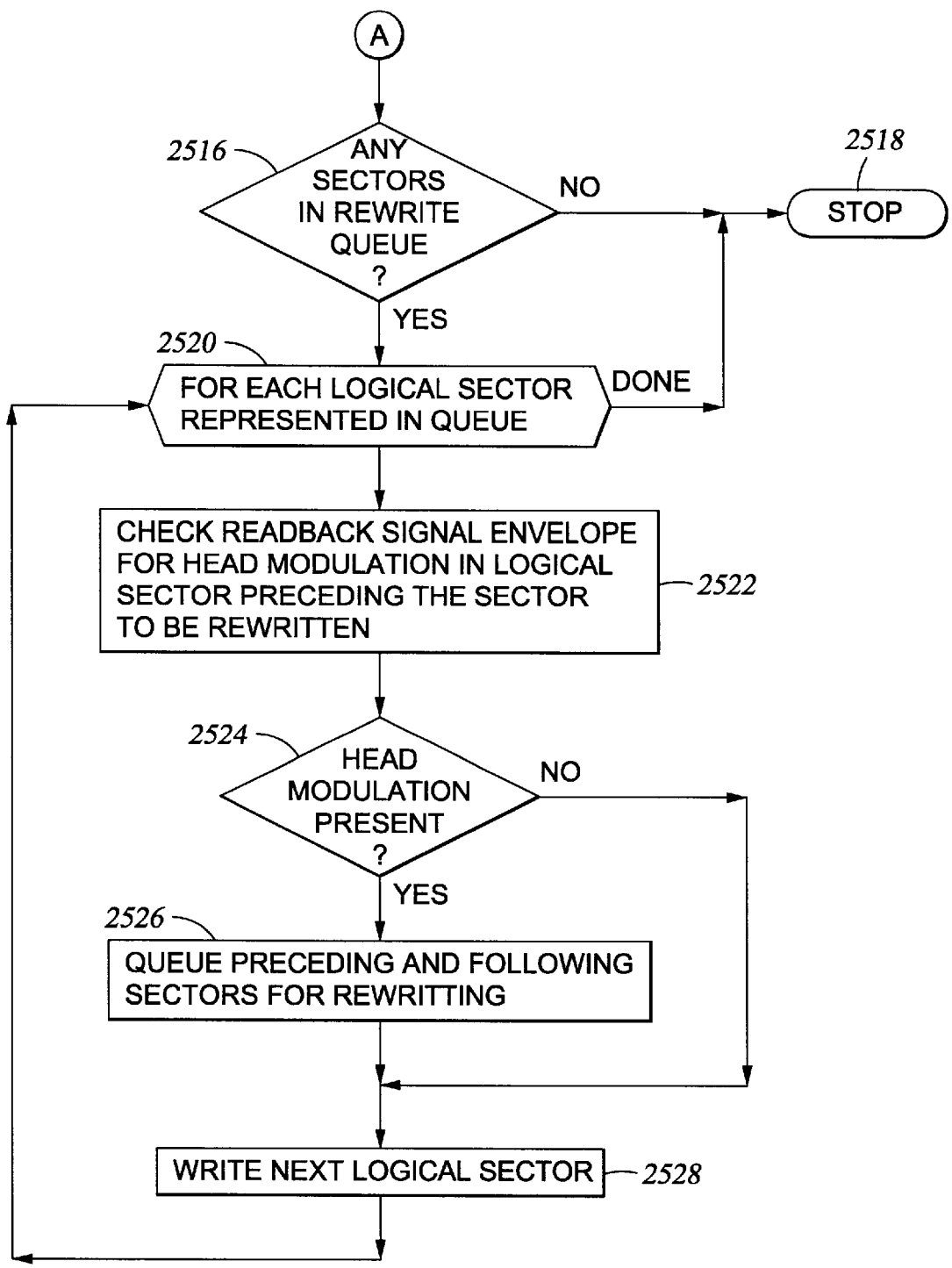

FIG. 25 shows a method 2500 for determining head modulation during a pattern of alternate reading and writing. In general, the method 2500 tracks sectors that need to be rewritten. This is done by managing a queue containing entries for each sector to be rewritten. Sectors that need to be rewritten include any sector preceding or following head modulation activity.

The method 2500 is entered at step 2502 at a particular track for a given head and proceeds to step 2504 where a readback signal for a logical sector on a disk is acquired. At step 2506 readback signal envelope is analyzed for head modulation. At step 2508 the method 2500 queries whether head modulation is present in the logical sector from which the readback signal envelope was acquired. If so, the preceding and following sectors (with respect to the sector from which the readback signal envelope was acquired) are placed in a rewrite queue, at step 2510. In addition, the data to be rewritten to the sectors specified in the rewrite queue is stored in some buffer.

If step 2508 is entered negatively, or following step 2510, the method 2500 proceeds to step 2512 to query whether the last sector has been written. If not, the next sequential logical sector is written at step 2514. Thus, a right operation takes place the than in the event that head modulation is detected at step 2508. This is because by the time the readback signal envelope has been analyzed for head modulation, the head is already into the next sector. However, in another embodiment, detection of head modulation may be done before leaving the sector from which the readback signal envelope was acquired. In this case, steps may be taken to stabilize the disk drive facility before writing to any other sectors. In any event, the method 2500 and returns to step 2504 to get another readback signal envelope for a logical sector. The logical sector being examined for this iteration of step 2504 may be the sector immediately following the sector written at 2514 or maybe any number of sectors thereafter.

Returning to step 2512, if the last sector has been written the method 2500 proceeds to step 2516 and queries whether any sectors are present in the rewrite queue. If not, the method exits at step 2518. If the rewrite queue contains a representation for at least one sector, the method 2500 enters a loop which is repeated for each sector. The loop is entered at step 2520 where a representation for a sector first to be rewritten is retrieved. At step 2522, the readback signal envelope is checked for head modulation in the logical sector preceding the sector to be rewritten. At step 2524 the method 2500 queries whether head modulation is present. If so, the preceding and following sectors (with respect to the sector from which the readback signal envelope was acquired) are queued in the rewrite queue. If step 2524 is entered negatively, or from step 2526, the method 2500 proceeds to step 2528 where the next logical sector (i.e., the next adjacent sector following the sector from which the readback signal envelope was acquired at step 2522) is written.

The method 2500 and returns to step 2520 to retrieve the next logical sector representation from the rewrite queue. Once all of the sectors represented in the rewrite queue have been processed the method 2500 exits at step 2518. In this manner, the method 2500 provides a degree of assurance that each sector has been written without head modulation.

In one embodiment, a write verification methods employed to test for excessive head modulation which occurred during a write operation. In general, the verification includes attempting to read the data written. Based on the entries in the rewrite queue, the disk drive facility can execute a read operation on the suspected badly written sectors to determine whether the data can be read. If the data can be read, then a sector need not be rewritten. In this case, the loop entered at step 2520 of the method 2500 may be avoided.

In addition, it is understood that any of the failure prevention embodiments provided herein may be used either independently or in combination. Thus, any variety of failure prevention steps may be taken upon determination of head modulation. For example, a failure prevention operation may be selected from one of (i) issuing a read-write inhibit signal and (ii) storing a reference to each suspect disk sector (i.e., a disk sector over which head modulation occurred immediately prior to a scheduled write operation in that sector). In the latter operation, the data to be written to each of the suspect disk sectors is preserved for a subsequent write attempt (as described with reference to FIG. 25). In either case, the determination of head modulation may be made using the reduced sorting algorithm, for example.

Thermal Signal Detection

In one embodiment, the reduced sorting algorithm 318 also computes a thermal component signal, th(m). As described above, the overall readback signal consists of two components, a magnetic component and a thermal component. The inventors have identified any changes in the baseline of the readback signal as being caused by the thermal signal component. The source of the thermal signal component has been discussed above. The following discussion provides embodiments for detection and analysis of the thermal signal component.

From the linearity of the readback process, superposition holds and the thermal signal component will add to the magnetic readback signal from the read/write head. The magnetic signal component readback signal is bandlimited by the physical and geometric properties of the head. Further, the magnetic signal component has roughly a zero mean when averaged over a long period in time. In contrast, the thermal signal component has a non-zero mean over time. Accordingly, the presence of changes in the thermal component, will result in an asymmetry of the overall readback signal. This asymmetry can be extracted by averaging the digital upper envelope sequence y_upper(m) and digital lower envelope sequence y_lower(m) of the overall readback signal. Accordingly, a a thermal component signal th(m) may be expressed as Equation 6.

$$th(m)=(y\_upper(m)+y\_lower(m))/2 \qquad \text{Equation 6}$$

Predictive Failure Analysis

Figure 8:
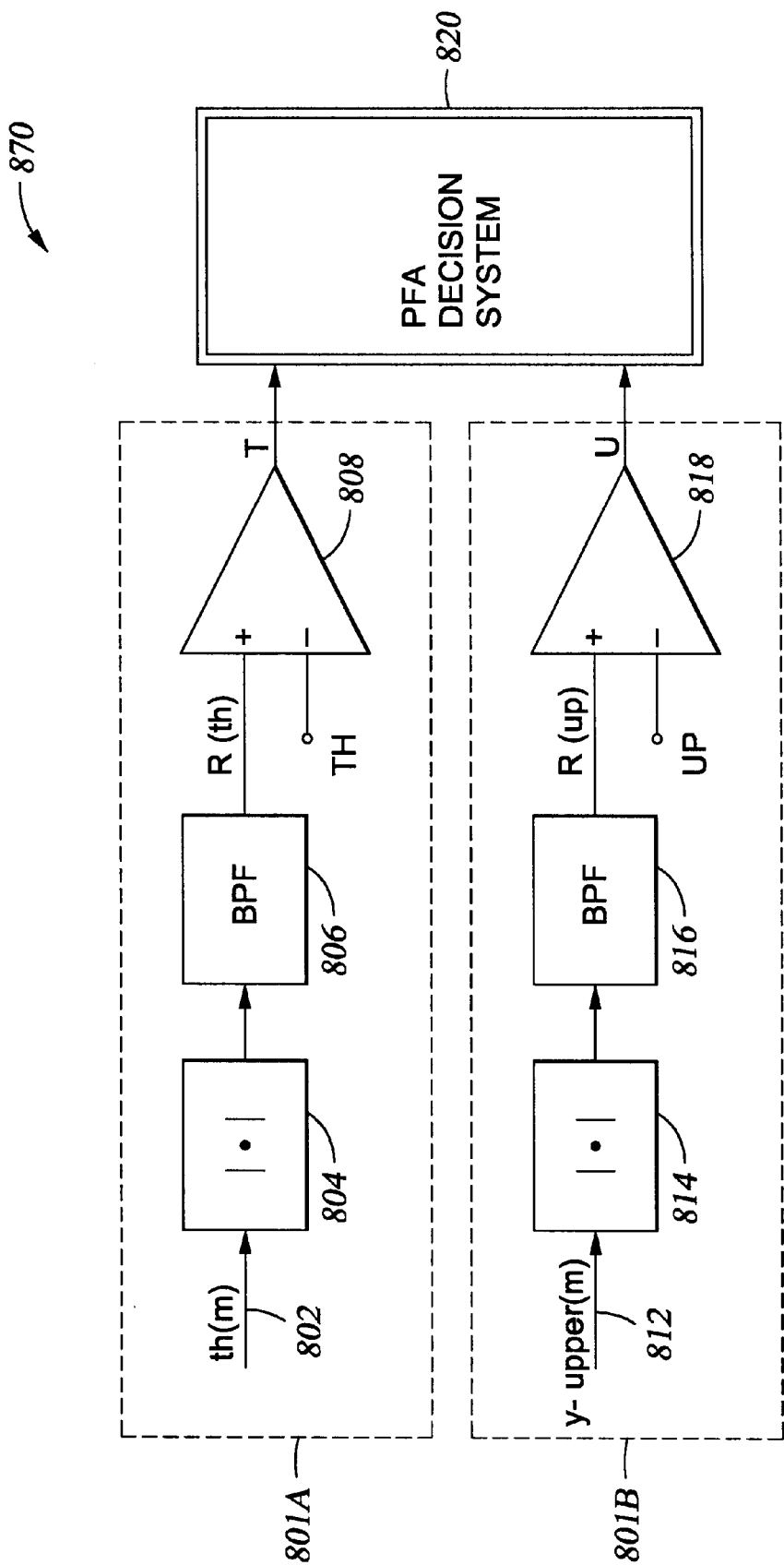
FIG. 8 is a system diagram of a predictive fail analysis system.

The thermal signal th(m) and the upper (or lower) envelope sample may then inputted to the PFA System 370 for additional analysis. The PFA system 370 is generally configured to determine the presence of a surface defect on a storage medium and/or head modulation activity. Once such a condition is detected, evasive or recovery steps may be taken. An illustrative embodiment of the PFA 370 is shown in FIG. 8.

In general, the PFA system 370 comprises a thermal signal component processing unit 801A, an envelope processing unit 801B and a PFA decision system 820. The thermal signal component processing unit 801A and the envelope processing unit 801B each comprise a rectifier 804, 814, a bandpass filter (BPF) 806, 816 and a comparator 808, 818. The thermal signal component processing unit 801A is configured to provide an output T to the PFA decision system 820. The envelope processing unit 801A is configured to provide an output U to the PFA decision system 820.

In operation, the PFA system 370 receives a thermal response th(m) and the upper (or lower) envelope, y_upper(m), from the dual envelope detector 317 (shown in FIG. 3). The thermal response th(m) is rectified by the rectifier 804, which may be in a full-wave or a half-wave rectifier. The rectified output is filtered by the BPF 806. Preferably, the filter characteristics for both BPFs, 806 and 816, are identical and such that airbearing resonance frequencies (e.g., 200–300 kHz) and thermal asperity frequencies (e.g., 1–2 MHZ) will pass through the filters. A discrete rectified output signal R(th) from the BPF 806 is compared to a tunable and disk-surface-specific reference signal TH in the comparator 808. The binary logical output T of the comparator 808 serves as one input to the PFA Decision System 420.

The upper envelope y_upper(m) is similarly rectified in a full-wave or a half-wave rectifier 814, and the rectified output is filtered by a bandpass filter (BPF) 816. The discrete rectified output signal R(up) from the BPF 816 is compared to a tunable and disk-surface-specific reference signal UP in the comparator 818. The binary logical output U serves as the another input to the PFA Decision System 820.

Illustrative decisions made by the PFA Decision System 820 are summarized in Table I. If both logic states, T and U, are zero, i.e., (T, U)=(0, 0), then the readback signal x(n) is behaving normally or a void has been detected. If an airbearing resonance occurred during the writing process, i.e., a head modulation event is present, then the logic thermal output, T, is zero (T=0), while the logic envelope response U is one (U=1). Thus, (T, U)=(0, 1). A pit is such that logical state T could be either zero or one, but the logic envelope state U=0. In this case, (T, U)=(1, 0). The three first entries in Table 1 may be considered non-critical and can be handled in various ways by the disk drive controller (shown in FIG. 3). The last entry in Table I, i.e., (T, U)=(1, 1), could cause a catastrophic failure (a disk crash) of the disk drive. Conditions capable of producing (T, U)=(1, 1) include bumps and other thermal asperities (TA). Illustrative graphical representations of modulation events and bumps/TA events are described below with reference to FIG. 12 and FIGS. 15–23.

TABLE I

| T | U | Decision |
|---|---|---|
| 0 | 0 | OK, Void |
| 0 | 1 | Head Modulation |
| 1 | 0 | pit |
| 1 | 1 | Bump, TA |

Data

Experimentation using the present embodiments demonstrates a high degree of effectiveness in the detection of envelopes over frequency-modulated data (i.e., data which produces a readback signal having a changing frequency). Once detected, the envelopes may be used to determine the presence of detrimental conditions such as head modulation and surface defects.

Figure 9:
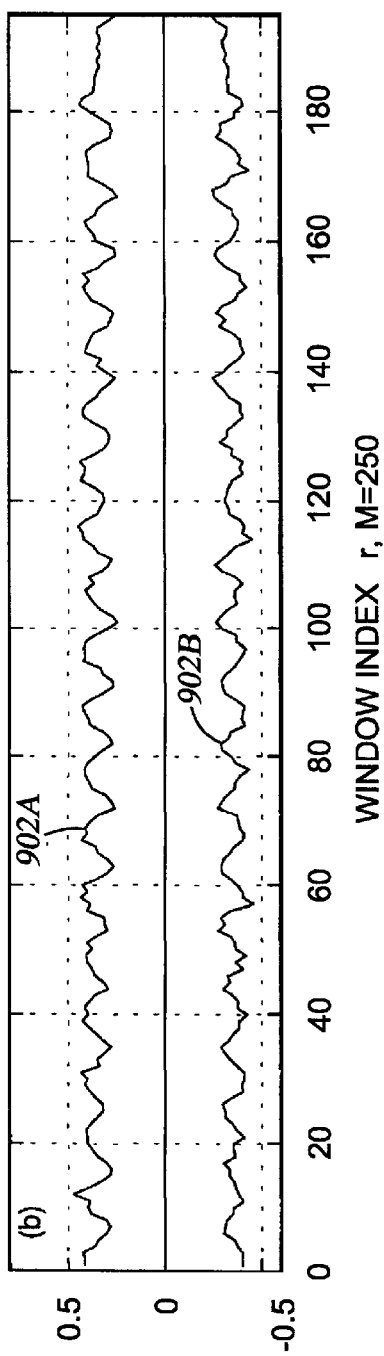
FIG. 9 is a graph showing envelope traces using a reduced sorting algorithm dual envelope detector.

In one aspect, improvements in accurately detecting a readback signal envelope are provided. Improvements over conventional methods can be illustrated with reference to FIGS. 1 and 2 and FIGS. 9–14. FIG. 9 shows an upper envelope 902A and lower envelope 902B of the readback signal 100 (shown in FIG. 1). The envelopes 902A–B were derived using an embodiment which is a subset of a nonlinear, ordered-statistics filter provided herein. A window length M=250 was used to derive the envelopes 902A–B. FIG. 9 illustrates how precisely the reduced ordered-statistics filter defines the modulating readback signal envelope in both amplitude and time as compared to the prior art envelopes 202 and 204.

Figure 1:
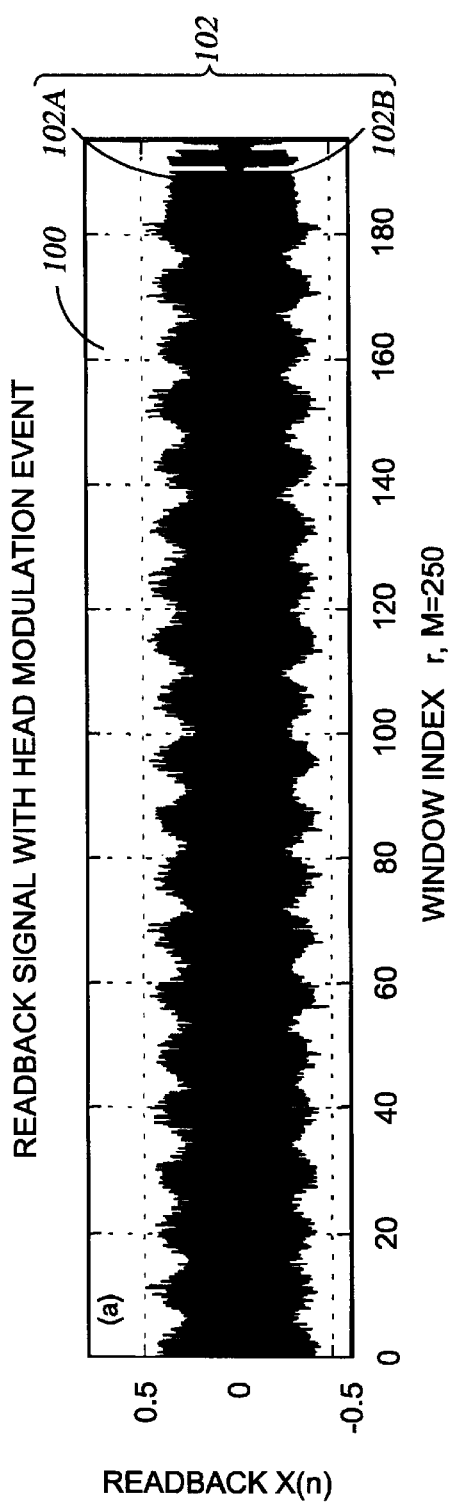
FIG. 1 is a graph of a readback signal with periodic envelope modulation.
Figure 2:
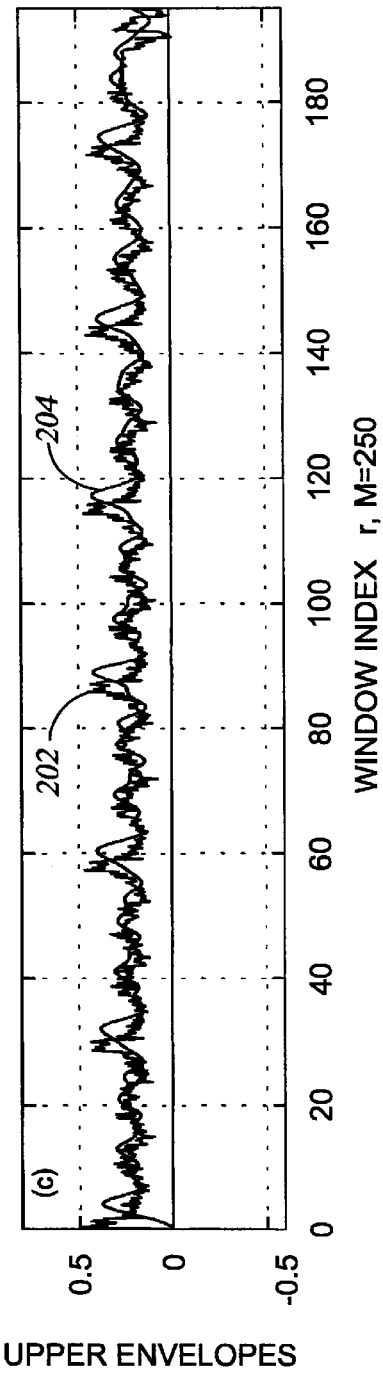
FIG. 2 is a graph of two envelopes representing the readback signal of FIG. 1 following lowpass filtering and full-wave rectification.
Figure 10:
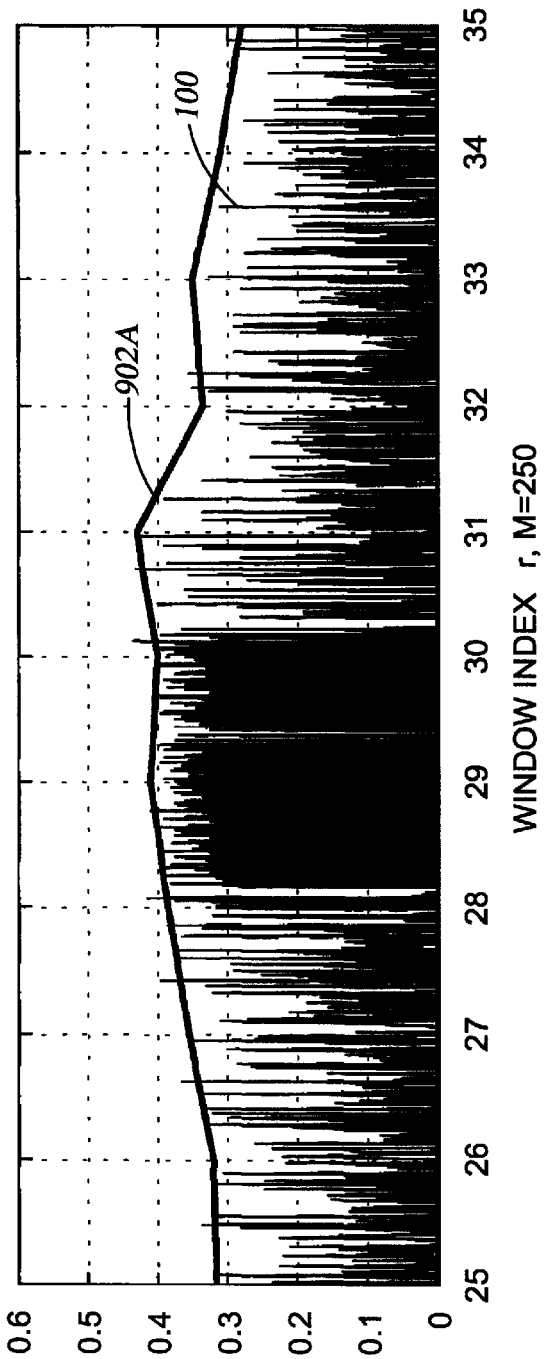
FIG. 10 is a graph showing a portion of the envelope trace shown in FIG. 9 and the readback signal shown in FIG. 1.

FIG. 10 shows a portion of the readback signal 100 from FIG. 1 and a corresponding portion of the upper envelope 902A from FIG. 9. Note how closely the upper envelope 902A "clings" to, or tracks, the frequency-modulated and amplitude-modulated readback signal 100. FIG. 11 is a comparative graph showing the corresponding envelope portions of envelopes 202, 204 (shown in FIG. 2) and 902A (shown in FIG. 9). In contrast to the envelope 902A, the prior art envelopes 202 and 204 fail to accurately represent the envelope of the readback signal 100. In particular, the filtered full-wave approach exhibits significant phase-shift as compared to the negligible phase shift of the envelope 902A. The presence of phase-shift is undesirable because of timing-registration errors in the envelope detector output.

Figure 12:
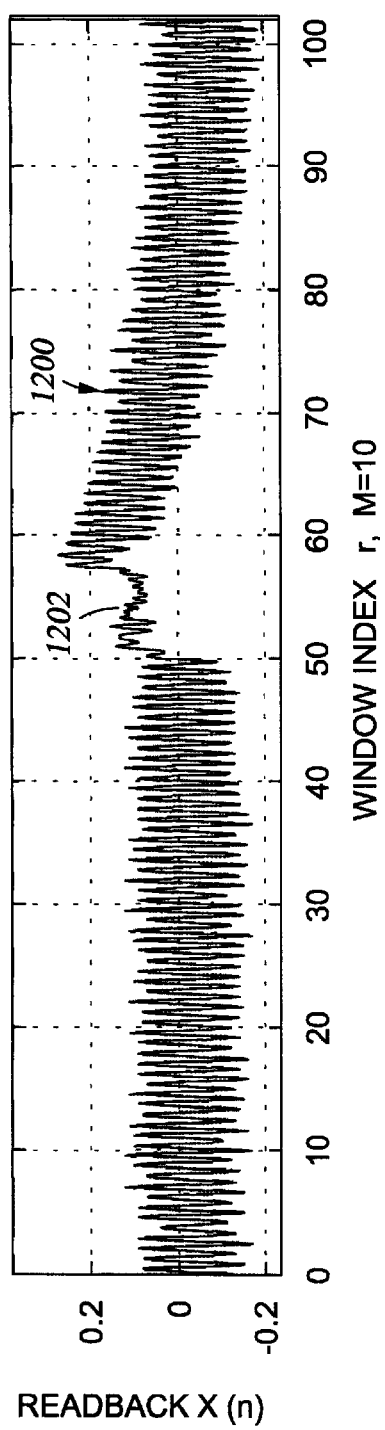
FIG. 12 is a graph showing a readback signal representing a thermal asperity.
Figure 13:
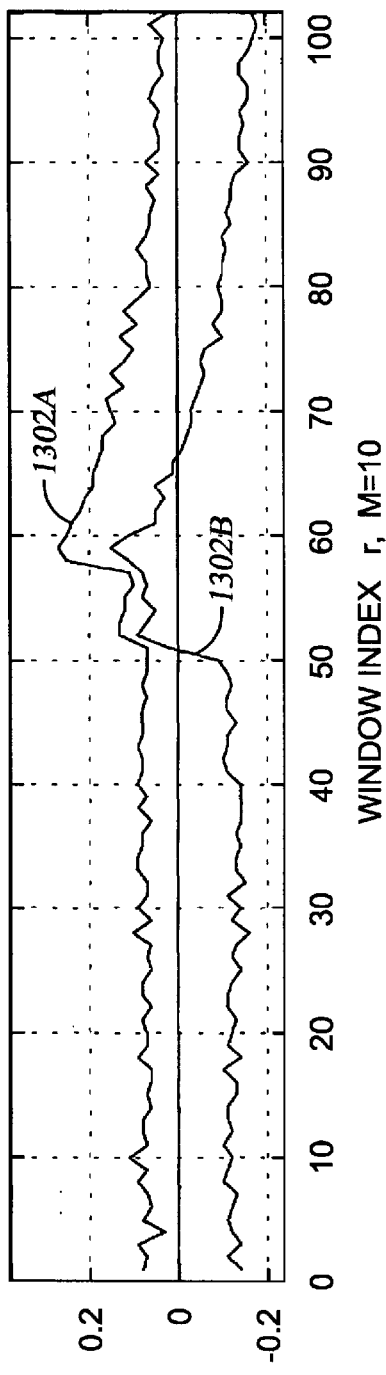
FIG. 13 is a graph showing envelope traces of the readback signal in FIG. 12 using a reduced sorting algorithm.
Figure 14:
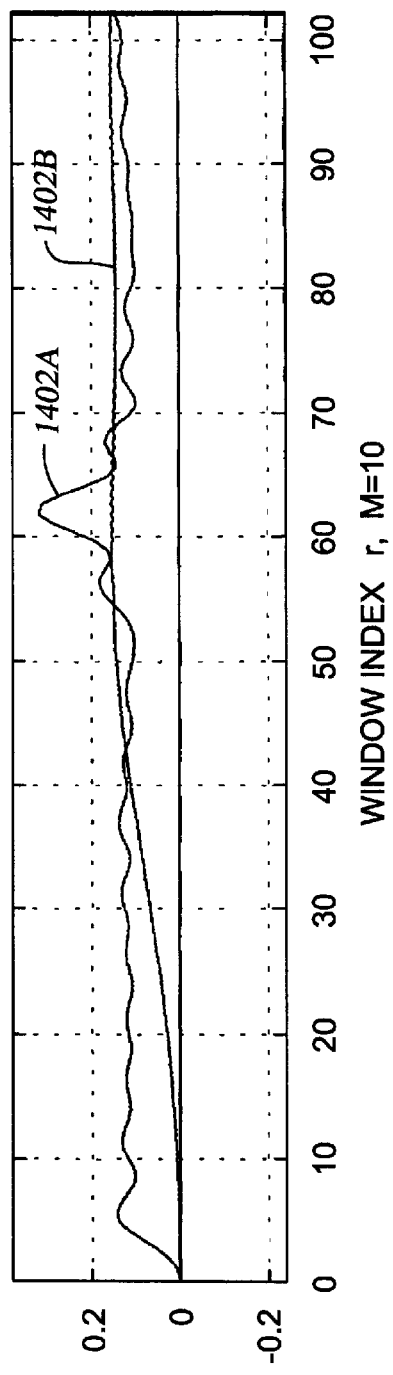
FIG. 14 is a graph showing envelope traces of the readback signal in FIG. 12 using conventional methods.

In another aspect, embodiments of the present invention facilitate detection of a thermal asperity over data that produces a frequency modulated readback signal. The effects of a thermal asperity in data are illustrated in FIG. 12 which shows an exemplary readback signal 1200 containing a thermal asperity signal portion 1202. The corresponding envelope signals, 1302A–B shown in FIG. 13, are obtained using the reduced sorting methods provided herein. A window length of M=10 and a sampling rate of 50 MHz were used. The trace 1302A is identical to the envelope sequence y(m) obtained from the reduced sorting algorithm with M=10. The thermal asperity detector system 360 (shown in FIG. 3) may use the upper envelope 1302A to detect a thermal asperity. Note how precisely the envelopes 1302A–B define the thermal asperity 1202 in FIG. 12 both in magnitude and in time. For purposes of comparison, FIG. 14 shows a pair of envelopes 1402A–B generated using a conventional filtered full-wave approach. A high-bandwidth (1 MHz) envelope 1402A shows the phase-shift (or phase-lag) problem associated with the filtered full-wave approach. Notably, a low-frequency (100 kHz) envelope 1402B fails to represent the thermal asperity.

In addition to envelope detection, embodiments of the present invention also provide for detecting a thermal signal component. FIGS. 12 and 15–22 illustrate readback signals, x(n), and their corresponding thermal response signals, th(n), acquired using embodiments provided herein. It should be noted that the readback signals x(n) are taken at the output of an AE module which operates as an amplifier cascaded with a highpass filter having a cutoff frequency of about 5 MHz. It is well known that a highpass filter acts as a differentiator below the cutoff frequency. Therefore, the thermal responses illustrated FIGS. 15, 17, 19, 21 and 22 are shown differentiated. To obtain the true thermal response the differentiated thermal responses have to be integrated appropriately. Illustrative methods for such integration are provided in U.S. Pat. No. 6,088,176, entitled "Method and Apparatus for Separating Magnetic and Thermal Components from an MR Read Signal."

Figure 15:
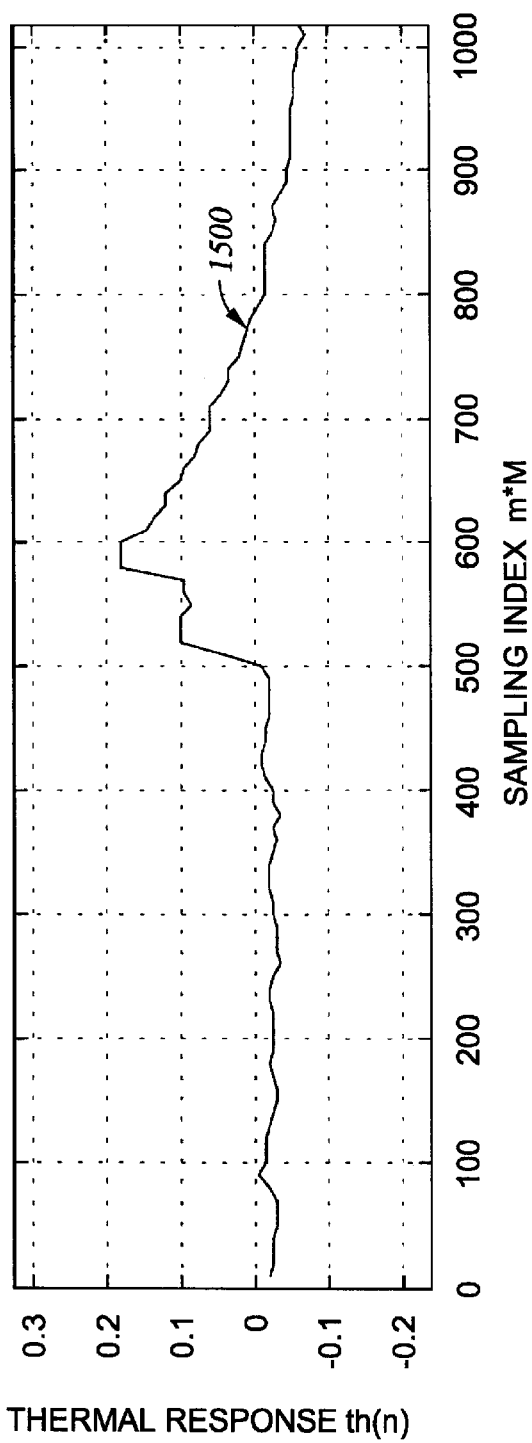
FIG. 15 is a graph showing a thermal response of a thermal asperity.

FIG. 12 shows an exemplary readback signal 1200 indicative of a thermal asperity (as represented by signal portion 1202). A corresponding thermal response 1500 using the sorting algorithm 318 is shown in FIG. 15. The window size, M, for the thermal response 1500 is equal to 10. As described above, a thermal asperity (TA) is a protruding defect that makes direct mechanical contact with the MR-stripe. The contact causes friction-heating and the resistance of the MR-element increases due to its positive temperature coefficient. The increased MR-resistance causes the voltage across the MR-element to increase for a constant MR-bias current. FIG. 15 is characteristic of such a voltage variation of more than 0.2 volts.

Figure 16:
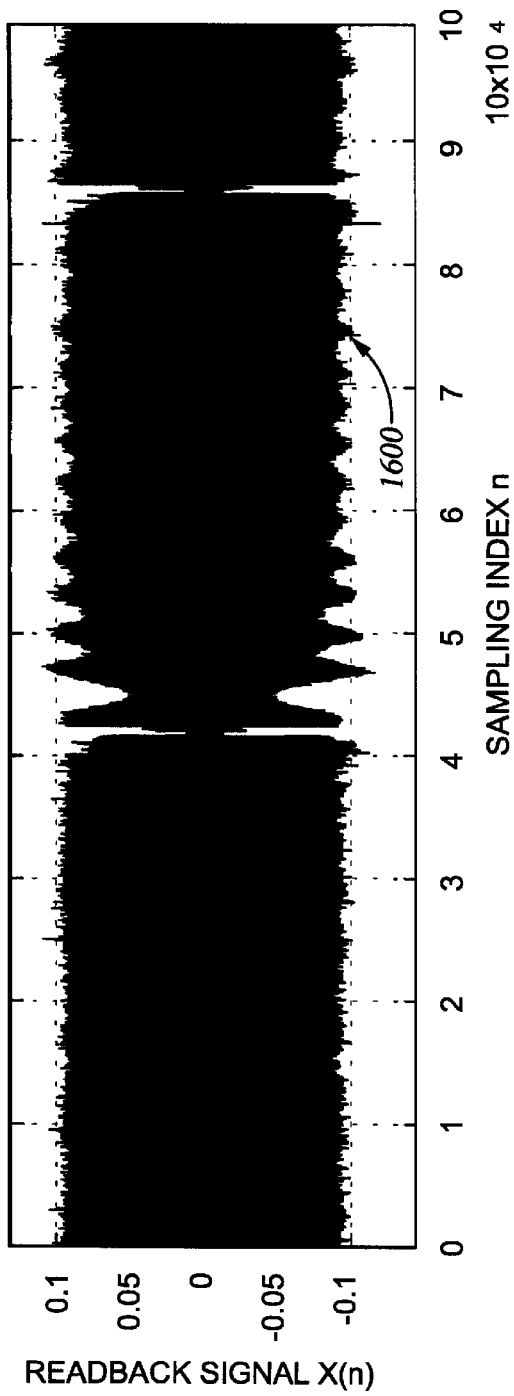
FIG. 16 is a graph showing a readback signal with head modulation.
Figure 17:
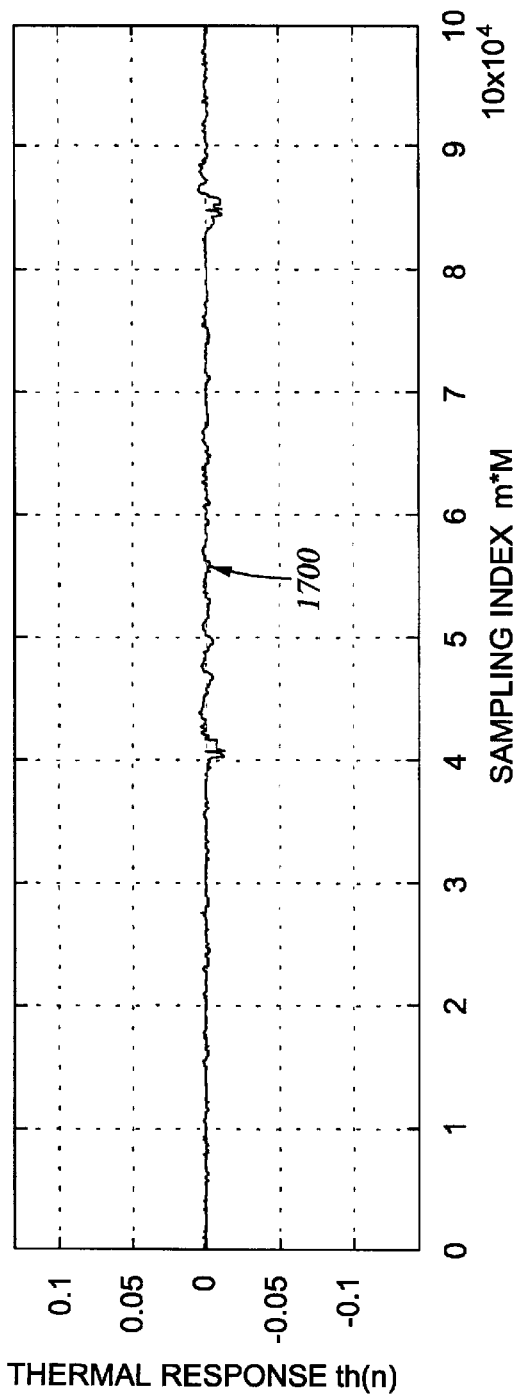
FIG. 17 is a graph showing a thermal response of the readback signal of FIG. 16. 16.

FIGS. 16 and 17 show a readback signal 1600 and corresponding thermal response 1700. The window size, M, for the thermal response 1700 is 100. The signals 1600 and 1700 are representative of traces occurring in the presence of a small bump. A protruding bump may or may not come in direct mechanical contact with the MR-stripe, however, it will influence the flyheight of the air-bearing slider. The FIG. 16 shows how the slider airbearing resonates after a being disturbed by a small bump. The thermal response 1700 using the same scale as the readback signal 1600 indicates some airbearing resonance. The sharp "glitches" in FIG. 16 indicate the readback signal induced during servo-sector boundaries. Notice the false influence the servo-sector glitch has on the thermal response 1700. This false influence can be reduced by increasing the size of the window M used by the reduced sorting algorithm 318.

Figure 18:
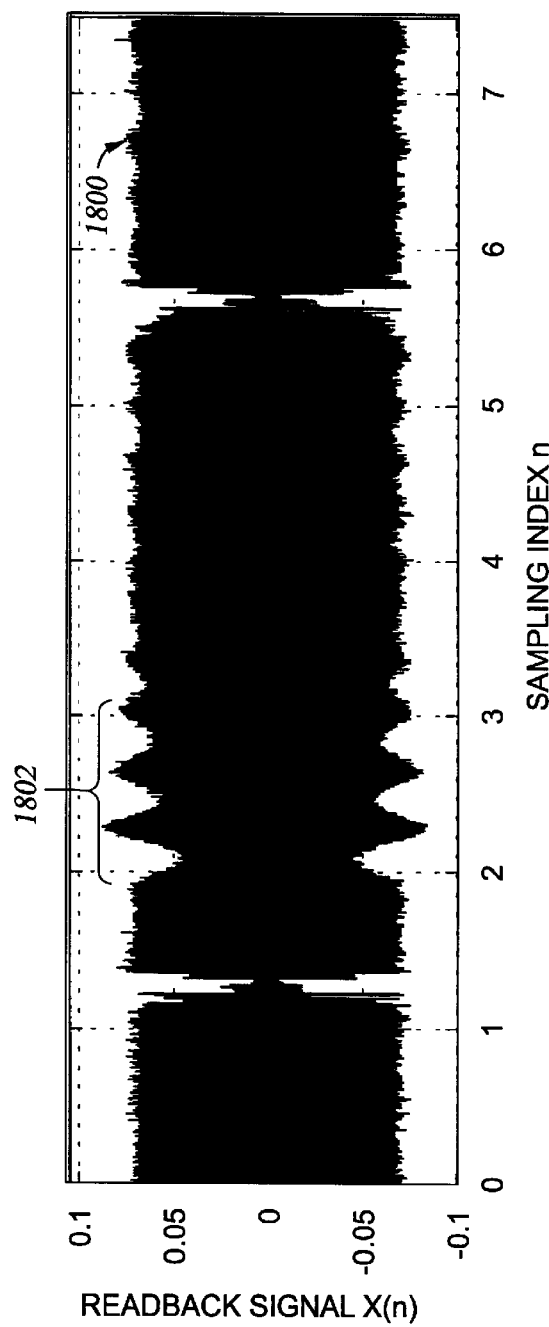
FIG. 18 is a graph showing a symmetric readback signal with periodic head modulation.
Figure 19:
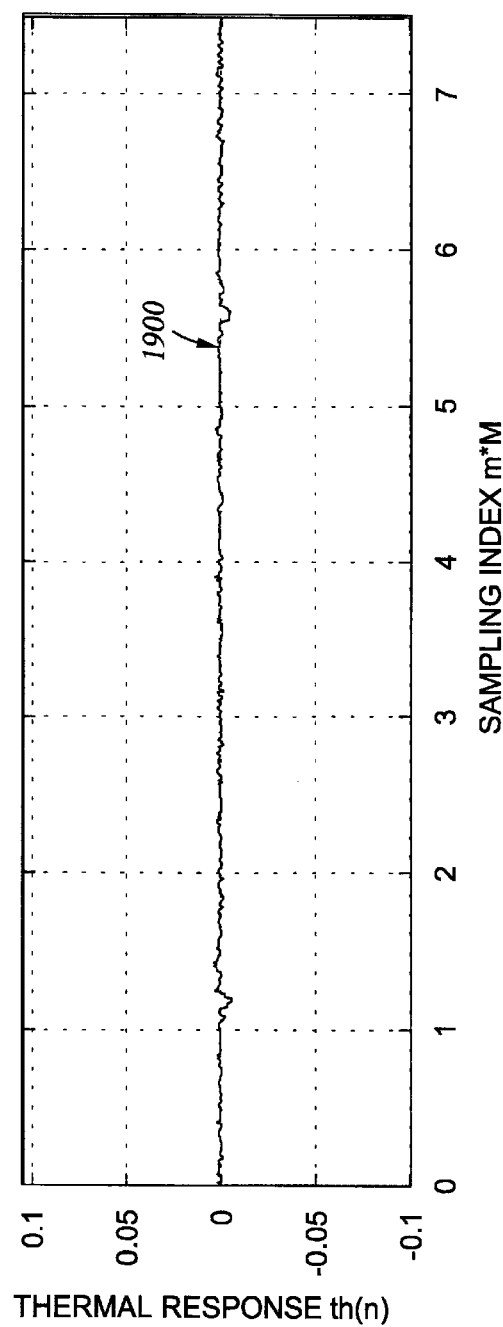
FIG. 19 is a graph showing a nonsymmetric thermal response of the readback signal of FIG. 18.

FIGS. 18–19 show a readback signal 1800 and corresponding thermal response 1900 in the presence of periodic head modulation. The periodic head modulation is represented by a modulating signal portion 1802. Head modulation activity is caused by an airbearing resonance in the slider during the writing/reading process. The airbearing disturbance may be caused by a protruding bump, a loose particle or debris attached to the slider (the latter results in dynamic head instability due to altered flying characteristics of the slider). Each of these conditions can cause periodic head modulation which produces a concurrent thermal component in a signal. However, when the data written during head modulation is later read, no thermal component is present in the readback signal. This is illustrated by FIG. 19. Again, the sharp glitches in FIG. 18 indicate servo-sector boundaries the effect of which on the thermal response 1900 may be reduced by increasing the size of the window M used by the reduced sorting algorithm 318.

Figure 20:
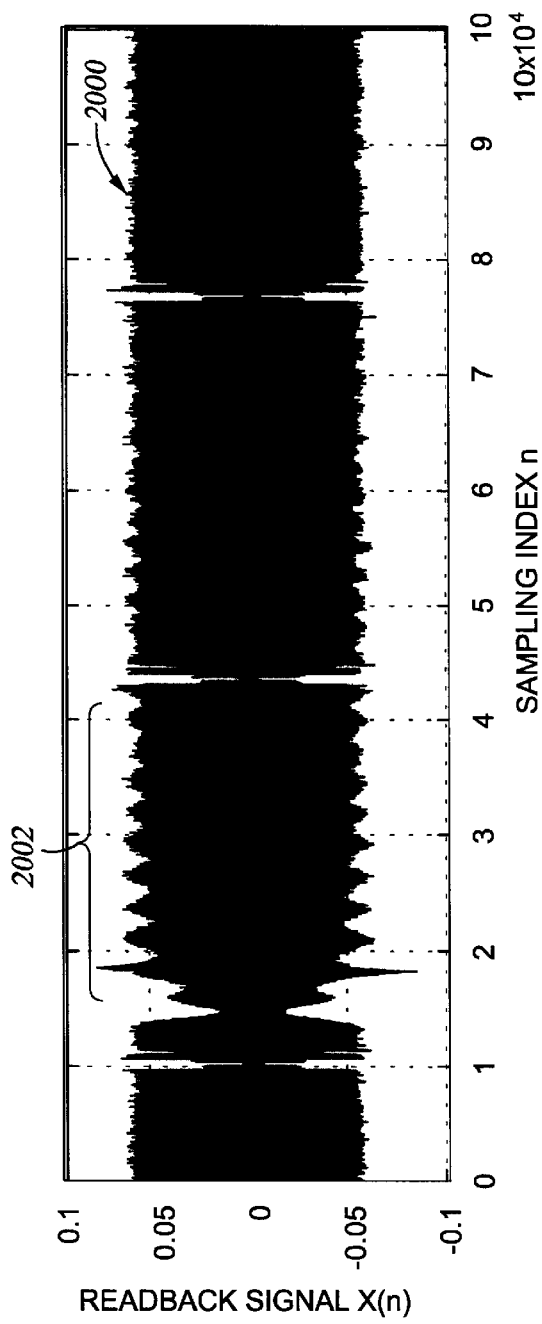
FIG. 20 is a graph showing a readback signal with periodic head modulation.
Figure 21:
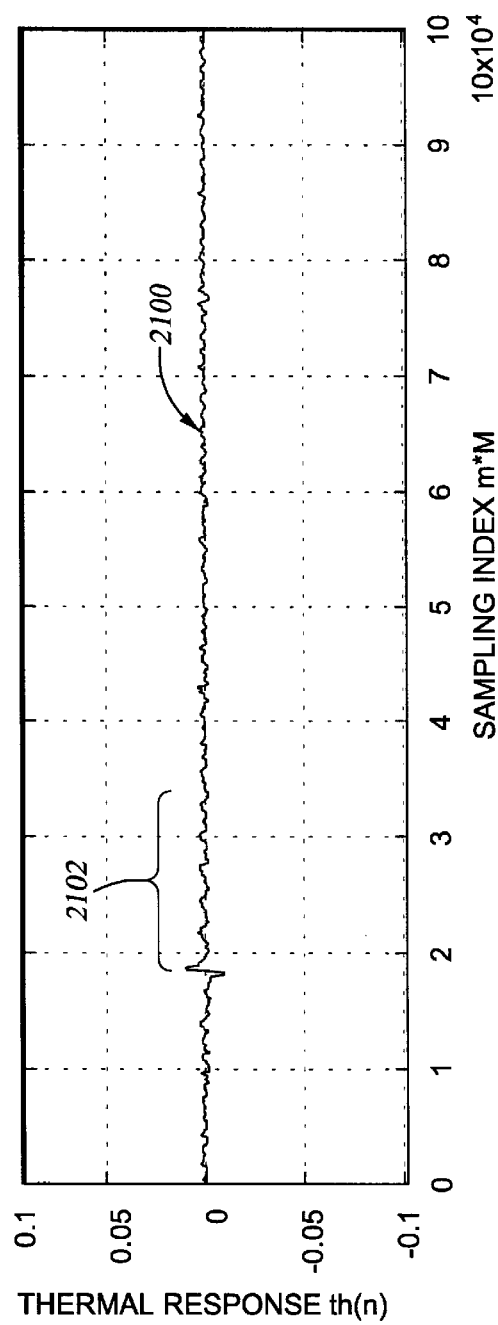
FIG. 21 is a graph showing a thermal response of the readback signal of FIG. 20.

FIGS. 20–21 show a readback signal 2000 and corresponding thermal response 2100 in the presence of a relatively larger bump. Modulating signal portion 2002 of FIG. 20 illustrates how the slider airbearing is resonating after a being disturbed by the bump. The differentiated thermal response 2100 using the same scale as the readback signal clearly represents the airbearing resonance by modulating portion 2102. Again, the sharp glitches in FIG. 20 indicate servo-sector boundaries the effect of which on the thermal response 2100 may be reduced by increasing the size of the window M used by the reduced sorting algorithm 318.

FIG. 22 shows the differentiated thermal response 2100 after amplification. The amplified signal is referenced as the thermal response 2200 and accentuates the airbearing resonance as modulating signal portion 2202.

Thus, FIGS. 15–22 demonstrate how the thermal response varies between a head modulation event and a bump/TAevent. Specifically, if the periodic head modulation event produces little thermal response, an airbearing modulation event occurred while writing the data.

While the foregoing is directed to the preferred embodiment of the present invention, other and further embodiments of the invention may be devised without departing from the basic scope thereof, and the scope thereof is determined by the claims that follow.

What is claimed is:

1. A method, comprising:
   receiving an envelope of a frequency modulated readback signal representative of data read by a head assembly from a storage medium;
   based on amplitude characteristics of the envelope, determining modulation activity of the head assembly; and
   terminating at least one of a read operation and a write operation.

2. The method of claim 1, wherein determining modulation activity comprises determining the presence of thermal component in the readback signal.

3. The method of claim 1, wherein if a write operation to a disk sector is terminated, further comprising writing to a different disk sector.

4. The method of claim 1, wherein terminating comprises issuing an inhibit signal.

5. The method of claim 1, further comprising determining that the modulation activity of the head assembly is due to a defect on the storage medium.

6. The method of claim 1, further determining that the modulation activity of the head assembly is due to an airbearing frequency of the head assembly.

7. The method of claim 1, wherein determining modulation activity comprises locating envelope samples within a window of the of the readback signal, each envelope sample comprising an Nth largest envelope sample and an Nth smallest envelope sample.

8. The method of claim 7, wherein determining modulation activity further comprises:
   assembling the envelope samples to provide assembled envelope samples;
   filtering the assembled envelope samples at an airbearing frequency and outputting a filtered signal;
   determining modulation activity of the head assembly if the filtered signal exceeds a predetermined threshold indicative of normal non-modulating head assembly operation.

9. The method of claim 8, wherein the predetermined threshold is calibrated at a level indicative of normal non-modulating operation.

10. The method of claim 7, wherein locating envelope samples comprises:
    (a) retrieving two samples from one of the windows;
    (b) sorting the two samples in a descending ordered list in the case of the Nth largest envelope;
    (c) sorting the two samples in an ascending ordered list in the case of the Nth smallest envelope;
    (d) retrieving a next consecutive sample from the window;
    (e) in the case of the descending ordered list, replacing a second descending sample with the next consecutive sample if the next consecutive sample is greater than the second descending sample; and
    (f) in the case of the ascending ordered list, replacing a second ascending sample with the next consecutive sample if the next consecutive sample is greater than the second ascending sample.

11. The method of claim 10, further comprising:
    (g) sorting the descending ordered list and the ascending ordered list; and
    (h) repeating steps (a)–(g) for each sample in the window.

12. The method of claim 11, further comprising determining an estimate of an amplitude of the readback signal.

13. The method of claim 1, wherein determining modulation activity comprises locating, from the readback signal, envelope samples of a predetermined size over a series of consecutive and adjacent windows.

14. The method of claim 13, wherein a length, M, of the windows is determined according to an equation M>fs/fw, where fs is a sampling rate of the readback signal and fw is a lowest frequency component of the readback signal representative of a data portion of the readback signal.

15. The method of claim 13, wherein locating the envelope samples of the predetermined size comprises locating an Nth largest envelope sample and an Nth smallest envelope sample of the readback signal.

16. The method of claim 13, wherein the envelope samples of the predetermined size make up less than all of the envelope samples contained in the readback signal.

17. The method of claim 13, wherein determining modulation activity further comprises:
    assembling the envelope samples to provide assembled envelope samples;
    filtering the assembled envelope samples at an airbearing frequency and outputting a filtered signal; and
    determining modulation activity of the head assembly if the filtered signal exceeds a predetermined threshold indicative of normal non-modulating head assembly operation.

18. The method of claim 17, wherein the predetermined threshold is calibrated at a level indicative of normal non-modulating operation.

19. The method of claim 13, wherein locating envelope samples comprises:
    (a) retrieving two samples from one of the windows;
    (b) sorting the two samples in a descending ordered list in the case of the Nth largest envelope;
    (c) sorting the two samples in an ascending ordered list in the case of the Nth smallest envelope;
    (d) retrieving a next consecutive sample from the window;
    (e) in the case of the descending ordered list, replacing a second descending sample with the next consecutive sample if the next consecutive sample is greater than the second descending sample; and
    (f) in the case of the ascending ordered list, replacing a second ascending sample with the next consecutive sample if the next consecutive sample is greater than the second ascending sample.

20. The method of claim 19, further comprising:
    (g) sorting the descending ordered list and the ascending ordered list;
    (h) repeating steps (a)–(g) for each sample in the window; and
    (i) repeating step (h) for each of the windows.

21. The method of claim 20, further comprising determining an estimate of an amplitude of the readback signal.

22. The method of claim 21, further comprising outputting the estimate to an envelope smoothing device.

23. A signal bearing medium, comprising a sorting program for determining values of a readback signal envelope in order to determine head modulation activity of a head assembly in a disk drive facility wherein the sorting program, when executed by a processor, performs a method, comprising:

receiving a frequency modulated readback signal representative of data read by a head assembly from a storage medium; and locating envelope samples within a window of the of the readback signal, each envelope sample comprising an Nth largest envelope sample and an Nth smallest envelope sample.

24. The signal bearing medium of claim 23, wherein locating envelope samples comprises:

(a) retrieving two samples from a window comprising a plurality of samples;

(b) sorting the two samples in a descending ordered list in the case of the Nth largest envelope;

(c) sorting the two samples in an ascending ordered list in the case of the Nth smallest envelope;

(d) retrieving a next consecutive sample from the window;

(e) in the case of the descending ordered list, replacing a second descending sample with the next consecutive sample if the next consecutive sample is greater than the second descending sample; and (f) in the case of the ascending ordered list, replacing a second ascending sample with the next consecutive sample if the next consecutive sample is greater than the second ascending sample.

25. The signal bearing medium of claim 24, further comprising:

(g) sorting the descending ordered list and the ascending ordered list;

(h) repeating steps (a)–(g) for each sample in the window; and (i) repeating step (h) for each window in a plurality of windows.

26. The signal bearing medium of claim 25, further comprising determining an estimate of an amplitude of the readback signal.

27. The signal bearing medium of claim 26, further comprising outputting the estimate to an envelope smoothing device.

28. An apparatus configured to determine head modulation activity of a head assembly in a disk drive facility, comprising:

a write inhibit system configured to output a readback signal and configured to issue at least a write inhibit signal when threshold conditions are satisfied; and an envelope detector connected to the write inhibit system and configured to locate envelope samples of a predetermined size from the readback signal over a series of consecutive and adjacent windows, each window comprising M samples.

29. The apparatus of claim 28, wherein the readback signal is a frequency modulated signal representative of data read from a storage medium.

30. The apparatus of claim 28, further comprising a filter centered at an airbearing frequency and configured to receive a form of the samples; wherein the write inhibit system is configured to receive a filtered signal from the filter and further configured to determine modulation activity of the head assembly if the filtered signal exceeds a predetermined threshold indicative of normal non-modulating operation.

31. The apparatus of claim 28, wherein the predetermined threshold is calibrated at a level indicative of normal non-modulating operation.

32. The apparatus of claim 28, wherein the envelope detector is further configured to locate upper envelope samples and lower envelope samples from the readback signal.

33. The apparatus of claim 28, wherein the envelope detector is configured with a sorting algorithm which, when executed, locates the envelope samples.

34. The apparatus of claim 28, further comprising an arm-electronic module configured to amplify the readback signal and output the amplified readback signal to the write inhibit system.

35. The apparatus of claim 28, further comprising an envelope smoothing device connected to the envelope detector and configured to sequentially assemble the envelope samples output by the envelope detector.

36. The apparatus of claim 28, further comprising at least one of a thermal asperity detector and a predictive failure analysis system connected to at least one of the envelope detector and the envelope smoothing device.

37. The apparatus of claim 28, wherein the samples located by the envelope detector are of an envelope of the readback signal.

38. The apparatus of claim 37, wherein the envelope detector is configured to locate an Nth largest envelope sample and an Nth smallest envelope sample within a window of the readback signal.

39. The apparatus of claim 28, further comprising:

an arm-electronic module configured to amplify the readback signal and output the amplified readback signal to the write inhibit system; and an envelope smoothing device connected to the envelope detector and configured to sequentially assemble the samples output by the envelope detector.

40. The apparatus of claim 39, wherein the envelope detector is configured to locate an Nth largest envelope sample and an Nth smallest envelope sample within a window of the readback signal.

* * * * *